United States Patent
Nishimura et al.

(10) Patent No.: US 6,834,111 B1
(45) Date of Patent: Dec. 21, 2004

(54) DATA TRANSMITTING/RECEIVING METHOD, DATA TRANSMITTER, DATA RECEIVER, DATA TRANSMITTING/ RECEIVING SYSTEM, AV CONTENT TRANSMITTING METHOD, AV CONTENT RECEIVING METHOD, AV CONTENT TRANSMITTER, AV CONTENT RECEIVER, AND PROGRAM RECORDING MEDIUM

(75) Inventors: Takuya Nishimura, Osaka (JP); Hiroyuki Iitsuka, Katano (JP); Masazumi Yamada, Moriguchi (JP); Shoichi Gotoh, Katano (JP); Hideaki Takechi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/445,052

(22) PCT Filed: Mar. 30, 1999

(86) PCT No.: PCT/JP99/01606
§ 371 (c)(1),
(2), (4) Date: Dec. 1, 1999

(87) PCT Pub. No.: WO99/50992
PCT Pub. Date: Oct. 7, 1999

(30) Foreign Application Priority Data

| Apr. 1, 1998 | (JP) | ............................................. | 10-089098 |
| Jun. 9, 1998 | (JP) | ............................................. | 10-161082 |
| Jun. 10, 1998 | (JP) | ............................................. | 10-162667 |

(51) Int. Cl.$^7$ ................................................. H04L 9/00
(52) U.S. Cl. ........................ 380/255; 380/259; 380/281; 380/284; 713/171
(58) Field of Search ................................ 380/259, 281, 380/284, 245, 255; 713/171

(56) References Cited

U.S. PATENT DOCUMENTS 5,058,162 A * 10/1991 Santon et al. ................. 705/51

(List continued on next page.)

FOREIGN PATENT DOCUMENTS

| JP | 59-134949 | 8/1984 |
| JP | 63-15136 | 6/1988 |
| JP | 04-175025 | 6/1992 |

(List continued on next page.)

OTHER PUBLICATIONS

Office Action from Japanese Patent Office for Application No. JP 10–089098 mailed Sep. 2, 2003.

(List continued on next page.)

*Primary Examiner*—Gilberto Barrón
*Assistant Examiner*—Kambiz Zand
(74) *Attorney, Agent, or Firm*—RatnerPrestia

(57) ABSTRACT

A data transmitting and receiving method for improving transmission and reception efficiency can be obtained by improving the security through update of a control key and reduction of the frequency of the authentication and key exchange process. An STB 1 transmits encrypted digital data Kw (D) obtained by encrypting digital data D using a work key Kw, and an encrypted work key Kc (Kw) obtained by encrypting the Kw using a control key Kc. The Kc is periodically or non-periodically updated, and an identifier L identifying the Kc is assigned to each Kc. A VTR device 2 decrypts the received Kc (Kw) using the Kc obtained by performing the authentication and key exchange process with the STB 1, decrypts the Kw (D) received using the Kw to obtain the D. It is determined whether or not the Kc has been updated while the reception process is suspended by referring to the transmitted L when the reception process is suspended and then resumed. If it is determined that the Kc has been updated, then the authentication and key exchange process is performed again to obtain the updated Kc.

14 Claims, 16 Drawing Sheets

U.S. PATENT DOCUMENTS

| | | | | |
|---|---|---|---|---|
| 5,081,678 | A | * | 1/1992 | Kaufman et al. ............ 713/161 |
| 5,790,663 | A | * | 8/1998 | Lee et al. ...................... 705/56 |
| 5,799,086 | A | * | 8/1998 | Sudia ............................ 705/76 |
| 5,894,516 | A | * | 4/1999 | Brandenburg ................. 705/51 |
| 6,049,878 | A | * | 4/2000 | Caronni et al. ............. 713/201 |
| 6,105,134 | A | * | 8/2000 | Pinder et al. ................ 713/170 |
| 6,209,098 | B1 | * | 3/2001 | Davis .......................... 713/194 |
| 6,226,618 | B1 | * | 5/2001 | Downs et al. .................. 705/1 |
| 6,347,145 | B2 | * | 2/2002 | Kato et al. ................... 380/284 |
| 6,398,245 | B1 | * | 6/2002 | Gruse et al. ................. 280/228 |
| 6,560,340 | B1 | * | 5/2003 | Akins et al. ................. 380/239 |
| 6,560,581 | B1 | * | 5/2003 | Fox et al. ...................... 705/51 |

FOREIGN PATENT DOCUMENTS

| | | |
|---|---|---|
| JP | 4-297157 | 10/1992 |
| JP | 08-331119 | 12/1996 |
| JP | 9-18468 | 1/1997 |
| JP | 9-18469 | 1/1997 |
| WO | WO 97/01231 | 1/1997 |

OTHER PUBLICATIONS

Japanese language search report for Int'l Appln. No. PCT/JP99/01606 dated Jul. 21, 1999.

English translation of Japanese language search report.

* cited by examiner

Operations of AV contents transmission device 31

DATA TRANSMITTING/RECEIVING METHOD, DATA TRANSMITTER, DATA RECEIVER, DATA TRANSMITTING/RECEIVING SYSTEM, AV CONTENT TRANSMITTING METHOD, AV CONTENT RECEIVING METHOD, AV CONTENT TRANSMITTER, AV CONTENT RECEIVER, AND PROGRAM RECORDING MEDIUM

This application is a U.S. NATIONAL PHASE APPLICATION OF PCT INTERNATIONAL APPLICATION PCT/JP99/01606

TECHNICAL FIELD

The present invention relates to a data transmitting/receiving method, a data transmission apparatus, a data reception apparatus, a data transmission/reception system, and a medium storing a program to direct a computer to perform all or a part of the function of means provided in each of the above described apparatuses.

In addition, the present invention relates to transmission of AV contents encrypted in different encrypting methods, and reception of the AV contents.

BACKGROUND ART

There are two conventional technologies, that is, a first conventional technology, and a second conventional technology, as described below.

First, the first conventional technology is described below. If data is to be provided only for a specific user, means, etc., then a method for preventing other users or means than the specific user or means from accessing the data is used by the transmission side encrypting and transmitting the data, and the reception side decrypting and uses the encrypted data.

The above described method is described below by referring to an example in which data is transmitted and received from an STB (Set Top Box, that is, a satellite broadcast receiver) for satellite broadcast to a VTR device for recording satellite broadcast data. In this method, data is encrypted to record correct satellite broadcast data only in the VTR device registered as a subscriber for recording satellite broadcast.

FIG. 14 shows a configuration of a conventional data transmission and reception system in which an STB for satellite broadcast functions as a data transmission device, and a VTR device functions as a data reception device. The configuration shows only the components relating to the transmission and reception of data between the STB and the VTR device, and reception means, etc. for receiving data from a satellite to the STB, and recording means, etc. for recording data to a recording medium in the VTR device are not shown here. The present system includes: an STB 101 for converting an electric wave received from a satellite into AV data and transmitting the data to a VTR device 102; and the VTR device 102 for recording the AV data transmitted from the STB 101 in the recording medium.

The STB 101 includes: encryption means 111 for periodically or non-periodically updating a work key Kw, performing a first encryption process using the work key Kw on digital data D obtained by converting an electric wave received from a satellite into AV data so that the digital data D can be converted into encrypted digital data Kw (D), and transmitting the result to the VTR device 102; a key encryption means 112 for generating a control key Kc, performing a second encryption process using the control key Kc on the work key Kw so that the work key Kw can be converted into an encrypted work key Kc (Kw), and transmitting the result to the VTR device 102; a transmission side authentication and key exchange means 113 for performing an authentication and key exchange process with the VTR device 102; and a D-I/F (digital interface) 114 for directly transmitting and receiving data to and from a D-I/F 124 of the VTR device 102.

The VTR device 102 includes: the D-I/F 124 for directly transmitting and receiving data to and from the D-I/F 114 of the STB 101; a reception side authentication and key exchange means 123 for performing an authentication and key exchange process with the transmission side authentication and key exchange means 113 of the STB 101; key restoration means 122 for decrypting the encrypted work key Kc (Kw) using the control key Kc obtained through the reception side authentication and key exchange means 123, and restoring the work key Kw; and decryption means 121 for decrypting the encrypted digital data Kw (D) using the work key Kw restored by the key restoration means 122, and restoring the digital data D.

The data transmitted from the STB 101 to the VTR device 102 is the encrypted digital data Kw (D), the encrypted work key Kc (Kw), and the control key Kc. However, since the encrypted digital data Kw (D) and the encrypted work key Kc (Kw) are encrypted data, and the control key Kc is transmitted after the transmission side authentication and key exchange means 113 and the reception side authentication and key exchange means 123 perform an authentication process, the system has high security against the third party who is illegally using data.

Described below is the second conventional technology. As described above, in recent years there has been developed a technology for transmitting AV contents (AV data) such as movies, etc. using a digital signal, and receiving the AV contents.

A transmission device for transmitting such AV contents encrypts AV contents before transmission to protect the AV contents. A reception device receives and decrypts the encrypted AV contents, and displays the AV contents on the monitor.

As described above, the transmission device encrypts the AV contents. However, there are plural types of encrypting methods for encrypting the AV contents. For example, if the reception device is a normal domestic electric appliance such as a television, etc., then a "basic encrypting method" referred to as a baseline cipher such as M6, Blowfish, etc. is used corresponding to the domestic electric appliance. On the other hand, if, for example, the reception device is an appliance having a high-level arithmetic operations capability such as a personal computer, etc., then an "extended encrypting method" such as DES or the like which is more complicated and has a higher encryption level is used.

As in the conventional technology, the objects of the present invention exist corresponding to each of the first and second conventional technologies. Therefore, the objects are sequentially described below.

First, the object corresponding to the first conventional technology is described below. As described above, the control key Kc is transmitted after being authenticated. However, if the same control key Kc is continuously used, it may probably be decrypted by the third party. Therefore, the system can have higher security by periodically or non-periodically updating the control key Kc. However, since it is necessary to perform the authentication and key exchange process each time the control key Kc is updated, it is strongly demanded to minimize the frequency of the authentication and key exchange process for the purpose of reducing the load onto the system and improving the transmission and reception efficiency.

FIG. 15 shows a relationship between the execution of the control key update process and the authentication and that of key exchange process when the control key is updated by the conventional data transmission and reception system. The horizontal axis indicates the passage of time. The bar in the first row indicates that the STB is transmitting a data signal. The arrow in the second row indicates the range in which the same control key Kc is used. FIG. 15 shows that control key Kc [1] is updated into control key Kc [2]. The bars in the third through fifth rows indicate that the VTR device is in a reception state. The ranges in which the bars are broken indicate that the reception is suspended. The two vertical arrows in the third through fifth rows indicate that the authentication and key exchange process has been performed.

Since the VTR device in case 1 is not suspended after starting the reception, it performs the authentication and key exchange process after starting the reception, and afterwards performs the authentication and key exchange process only when the control key Kc is updated. Since the VTR device in cases 2 and 3 is suspended after starting the reception, it is required to perform the authentication and key exchange process when resuming the reception. Especially, although the VTR device in case 3 is suspended only for a short time without update of the control key Kc when the reception is resumed, the authentication and key exchange process is to be performed again, thereby increasing the total frequency of the authentication and key exchange process to be performed as compared with the other cases.

The present invention has been developed to solve the above described problems of the conventional data transmitting and receiving method, and the conventional data transmission and reception system, and aims at providing a data transmitting and receiving method, a data transmission apparatus, a data reception apparatus, a data transmission and reception system for improving the transmission and reception efficiency by improving the security by updating a control key, and reducing the frequency of the authentication and key exchange process, and a program recording medium storing a program executed to direct a computer to perform all or a part of the function of means provided in each of the above described apparatuses.

The second conventional technology has the following problems. If the transmission device used when the second conventional technology is described is an appliance having a high-level arithmetic operations capability, such as a personal computer or the like, transmitting the AV contents through an IEEE 1394 bus, and the reception device receives the AV contents through the IEEE 1394 bus, and if, as described above, the reception device has a high-level arithmetic operations capability, such as a personal computer or the like, then the reception device can decrypt the AV contents although the transmission device uses the "extended encrypting method" by encrypting and transmitting the AV contents, thereby no problems arise.

However, for example, a normal domestic electric appliance such as a set top box (satellite broadcast receiver) 59 as well as a personal computer 58, that is, a reception device can also be connected to a transmission device 57 through the IEEE 1394 bus as shown in FIG. 16. In this case, assume that the transmission device 57 encrypts and transmits the AV contents in the "extended encrypting method," the personal computer 58 receives and decrypts the AV contents, and the set top box 59 tries to receive and decrypts the AV contents during the transmission. However, since the set top box 59 cannot use the "extended encrypting method," it cannot decrypt the AV contents.

DISCLOSURE OF THE INVENTION

As described above, the present invention aims at providing, in view of the problem that an AV contents reception device which cannot use a first encrypting method cannot decrypt the AV contents when the AV contents transmission device is transmitting the AV contents encrypted in the first encrypting method, an AV contents transmitting method for allowing the AV contents reception device which cannot use the first encrypting method to decrypt the AV contents when the AV contents transmission device is transmitting the AV contents encrypted in the first encrypting method.

The present invention also aims at providing an AV contents transmitting device for allowing the AV contents reception device which cannot use the first encrypting method to decrypt the AV contents when the AV contents encrypted in the first encrypting method is being transmitted.

The present invention further aims at providing an AV contents transmitting method and an AV contents receiving method capable of allowing an AV contents reception device, which is receiving and decrypting the AV contents encrypted in the first encrypting method in addition to an AV contents reception device which cannot use the first encrypting method, to continuously decrypt the AV contents when the above described AV contents transmitting method is used.

Furthermore, the present invention aims at providing an AV contents reception device, provided in addition to an AV contents reception device which cannot use the first encrypting method and which the above described AV contents transmission device tries to allow to decrypt the AV contents, for continuously decrypting the AV contents encrypted in the first encrypting method.

To solve the above-mentioned problems, one aspect of the present invention is a data transmitting and receiving method in which:

on a transmission side, encrypted digital data obtained by performing a first encryption process on digital data using a work key, and an encrypted work key obtained by performing a second encryption process on the work key using a control key, are transmitted, and on a reception side, the encrypted work key is received and decrypted using the control key obtained by performing an authentication and key exchange process with the transmission side, and the encrypted digital data is received and decrypted using the decrypted work key, thereby obtaining the digital data, characterized in that:

on said transmission side, the control key is periodically or non-periodically updated, an identifier identifying the control key is assigned for each control key; and on said reception side, when a reception process is suspended and then resumed, it is determined whether or not the control key has been updated while the reception process is being suspended by referring to the identifier transmitted from the transmission side, and, when it is determined that the control key has been updated, the authentication and key exchange process-is performed again, thereby obtaining the updated control key.

Another aspect of the present invention is a data transmission apparatus, characterized by comprising:

encryption means periodically or non-periodically updating/generating a work key, performing a first encryption process on digital data using the work key to convert the digital data into encrypted digital data, and transmitting the encrypted digital data to a data reception apparatus;

a key encryption means periodically or non-periodically updating/generating a control key, performing a second encryption process on the work key using the control key to convert the work key into encrypted work key, and transmitting the encrypted work key to the data reception apparatus;

a transmission side authentication and key exchange means performing an authentication and key exchange process with the data reception apparatus;

identifier generation means generating an identifier identifying the control key; and identifier transmission means transmitting the identifier to. the data reception apparatus.

Still another aspect of the present invention is a data reception apparatus, characterized by comprising:

a reception side authentication and key exchange means performing an authentication and key exchange process with a data transmission apparatus;

key restoration means restoring a work key by decrypting an encrypted work key converted by performing a second encryption process on the work key using a control key, said restoring process being performed using the control key obtained through said reception side authentication and key exchange means;

decryption means restoring digital data by decrypting encrypted digital data converted by performing a first encryption process on the digital data using the work key, said decrypting process being performed using the work key restored by said key restoration means; and identifier recognition means determining whether or not the control key has been updated by referring to an identifier identifying the control key transmitted from said data transmission apparatus at least when a reception process is suspended and then resumed, and, when it is determined that the control key has been updated, instructing said reception side authentication and key exchange means to perform again the authentication and key exchange process to obtain the updated control key.

Yet another aspect of the present invention is a data transmission and reception system, characterized by comprising:

a data transmission apparatus according to the present invention and a data reception apparatus according to the present invention.

Still yet another aspect of the present invention is a computer readable program recording medium, characterized by storing a program for directing a computer to perform each function of all or a part of each component of the data transmission apparatus and the data reception apparatus according to the present invention.

A further aspect of the present invention is an AV contents transmitting method, characterized by comprising the step of:

encrypting and transmitting AV contents in a second encryption method which can be used by an AV contents reception apparatus which cannot use a first encrypting method and issues an authentication request when an AV contents transmission apparatus transmits the AV contents encrypted in the first encrypting method using a transmission line.

A still further aspect of the present invention is the AV contents transmitting method, characterized in that when the authentication request is issued, and when there is an AV contents reception apparatus which receives and decrypts AV contents encrypted in the first encrypting method in addition to an AV contents reception apparatus which has issued the authentication request, the AV contents reception apparatus which receives and decrypts the AV contents in the first encrypting method is notified that an encrypting method is switched into the second encrypting method.

A yet further aspect of the present invention is the AV contents transmitting method, characterized in that a notification of switching the encrypting method is given in a predetermined command or is added to the AV contents.

A still yet further aspect of the present invention is the AV contents transmitting method, characterized in that information about what encrypting method is used as the second encrypting method after the switch is given in a predetermined command or is added to the AV contents.

Another aspect of the present invention is the AV contents transmitting method, characterized in that an encryption key or a seed of the encryption key used in the second encrypting method after the switch is given in a predetermined command or is added to the AV contents.

Still another aspect of the present invention is the AV contents transmitting method, characterized in that a switching timing of the encrypting method is an updating timing for an encryption key in the first encrypting method used before the authentication request is issued.

A further aspect of the present invention is the AV contents transmitting method, characterized in that a notification that the encrypting method is to be switched into the second encrypting method, and information about a switching timing of the encrypting method are transmitted to at least the AV contents reception apparatus which receives and decrypts the AV contents encrypted in the first encrypting method.

A still further aspect of the present invention is the AV contents transmitting method, characterized in that:

said AV contents transmission apparatus stores an AV contents reception apparatus which issued the authentication request; and it is determined whether or not a command requesting an encryption key for decryption of the AV contents or a seed of the encryption key is received from the AV contents reception apparatus, and when the command is not received, the encrypting method is switched from the second encrypting method to the first encrypting method.

A yet further aspect of the present invention is the AV contents transmitting method, characterized in that:

said AV contents transmission apparatus checks the encrypting method available by each of the AV contents reception apparatus which issued the authentication request and the other AV contents reception apparatus; and when an AV contents reception apparatus transmitting a command requesting an encryption key for decryption of the AV contents and the seed of the encryption key is an AV contents reception apparatus capable of using the first encrypting method, the encrypting method is switched from the second encrypting method to the first encrypting method.

A still further aspect of the present invention is a program recording medium, characterized by storing a program for directing a computer to perform each function of all or a part of each step of the AV contents transmitting method.

Another aspect of the present invention is an AV contents receiving method, characterized by comprising the steps of:

receiving AV contents transmitted from the AV contents transmitting method; and decrypting the encrypted AV contents based on an encrypting method used when the AV contents are encrypted and using an encryption key used in the encrypting method or a seed of the encryption key.

Still another aspect of the present invention is the AV contents receiving method, characterized in that:

there is information about switching the encrypting method transmitted together with or in the AV contents in the AV contents transmitting method; and when the information contains none or one of the information about what encrypting method is used after the switch, and the encryption key used in the encrypting method or a seed of the encryption key, the information about what encrypting method is used after the switch, or the encryption key used in the encrypting method or a seed of the encryption key, whichever is not contained in the information relating to the switch of the encrypting method, is to be transmitted to the AV contents transmission apparatus.

Yet another aspect of the present invention is a program recording medium, characterized by storing a program for directing a computer to perform each function of all or a part of each step of the AV contents receiving method.

Still yet another aspect of the present invention is an AV contents transmission apparatus, characterized by comprising:

encrypting method selection means selecting an encrypting method used when AV contents to be transmitted are encrypted;

encryption key generation means generating an encryption key for encrypting AV contents corresponding to the encrypting method selected by said encrypting method selection means;

encryption means receiving AV contents, also receiving the encryption key from the encryption key generation means, and encrypting the AV contents; and a transmission side authentication and key exchange means performing an authentication and key exchange process with an AV contents reception apparatus, wherein when the AV contents reception apparatus is transmitting the AV contents encrypted in the first encrypting method selected by said encrypting method selection means, and when the AV contents reception apparatus which cannot use the first encrypting method issues an authentication request, the transmission side authentication and key exchange means performs an authentication process with the AV contents reception apparatus which issued the authentication request., and said encrypting method selection means switches the encrypting method into the second encrypting method the AV contents reception apparatus which issued the authentication request can use.

A further aspect of the present invention is the AV contents transmission apparatus, characterized by further comprising an encrypting method notification means issues a notification that the encrypting method is switched into the second encrypting method to an AV contents reception apparatus which is provided in addition to the AV contents reception apparatus which issues an authentication request, and receives and decrypts the AV contents encrypted in the first encrypting method.

A still further aspect of the present invention is the AV contents transmission apparatus, characterized in that;

said encryption key generation means periodically or non-periodically updates the encryption key;

said encrypting method selection means switches the encrypting method into the second encrypting method at a timing of said encryption key generation means updating the encryption key in the first encrypting method.

A yet further aspect of the present invention is the AV contents transmission apparatus, characterized in that said transmission side authentication and key exchange means stores an AV contents reception apparatus which issued the authentication request, and it is determined whether or not a command requesting an encryption key for decryption of the AV contents or a seed of the encryption key is received from the AV contents reception apparatus; and when the command is not received, said encryption key generation means switches the encrypting method from the second encrypting method to the first encrypting method.

A still yet further aspect of the present invention is the AV contents transmission method, characterized in that:

said transmission side authentication and key exchange means checks the encrypting method available by each of the AV contents reception apparatus which issued the authentication request and the other AV contents reception apparatus; and when an AV contents reception apparatus transmitting a command requesting an encryption key for decryption of the AV contents and the seed of the encryption key is an AV contents reception apparatus capable of using the first encrypting method, said encryption key generation means switches the encrypting method from the second encrypting method to the first encrypting method.

An additional aspect of the present invention is the AV contents reception apparatus, characterized by further comprising:

a reception side authentication and key exchange means performing an authentication and key exchange process with said AV contents reception apparatus;

encrypting method storage means receiving and information about an encrypting method used in encrypting AV contents from said AV contents transmission apparatus; and decryption means receiving encrypted AV contents from the AV contents transmission apparatus, receiving an encryption key or a seed of the encryption key from said AV contents transmission apparatus, and decrypting the encrypted AV contents using the encryption key of the seed of the encryption key based on the encrypting method stored in said encrypting method storage means.

Still an additional aspect of the present invention is the AV contents reception apparatus, characterized by further comprising:

request means requesting transmitting information such that;

there is information about switching the encrypting method transmitted together with or in the AV contents from the AV contents transmission apparatus, and when the information contains none or one of the information about what encrypting method is used after the switch, and the encryption key used in the encrypting method or a seed of the encryption key, the information about what encrypting method is used after the switch, or the encryption key used in the encrypting method or a seed of the encryption key, whichever is not contained in the information is to be transmitted.

DESCRIPTION OF SYMBOLS

| | |
|---|---|
| 1, 101 | STB |
| 2, 102 | VTR device |
| 11, 111 | Encryption means |
| 12, 112 | Key encryption means |
| 13, 113 | Transmission side authentication and key exchange means |
| 14, 24, 114, 124 | D–I/F |
| 15 | Identifier generation means |
| 16 | Identifier transmission means |
| 21, 121 | Decryption means |
| 22, 122 | Key restoration means |
| 23, 123 | Reception side authentication and key exchange means |
| 25 | Identifier recognition means |
| 26 | Identifier storage means |
| 27 | Identifier request means |
| 31 | AV contents transmission device |
| 32 | First AV contents reception device |
| 33 | Second AV contents reception device |
| 34 | Antenna |
| 35, 36 | Monitor |
| 37 | Reception means |
| 38 | Encryption means |
| 39 | Kco generation means |
| 40 | Encrypting method selection means |
| 41, 46, 53 | AKE means |
| 42 | Encrypting method change notification means |
| 43 | Kco request command response means |
| 44, 45, 52 | Data transfer means |
| 47 | Encrypting method notification detection means |
| 48, 54 | Kco request command issue means |
| 49, 55 | Kco storage means |
| 50 | Encrypting method storage means |
| 51, 56 | Decryption means |
| 57 | Transmission device |
| 58 | Personal computer |
| 59 | Set top box (satellite broadcast receiver) |

BEST MODE FOR CARRYING OUT THE INVENTION

The embodiments of the present invention will be described below with reference to the attached drawings.
(First Embodiment)

The first embodiment of the present invention will be described below with reference to the attached drawings.

Figure 1:
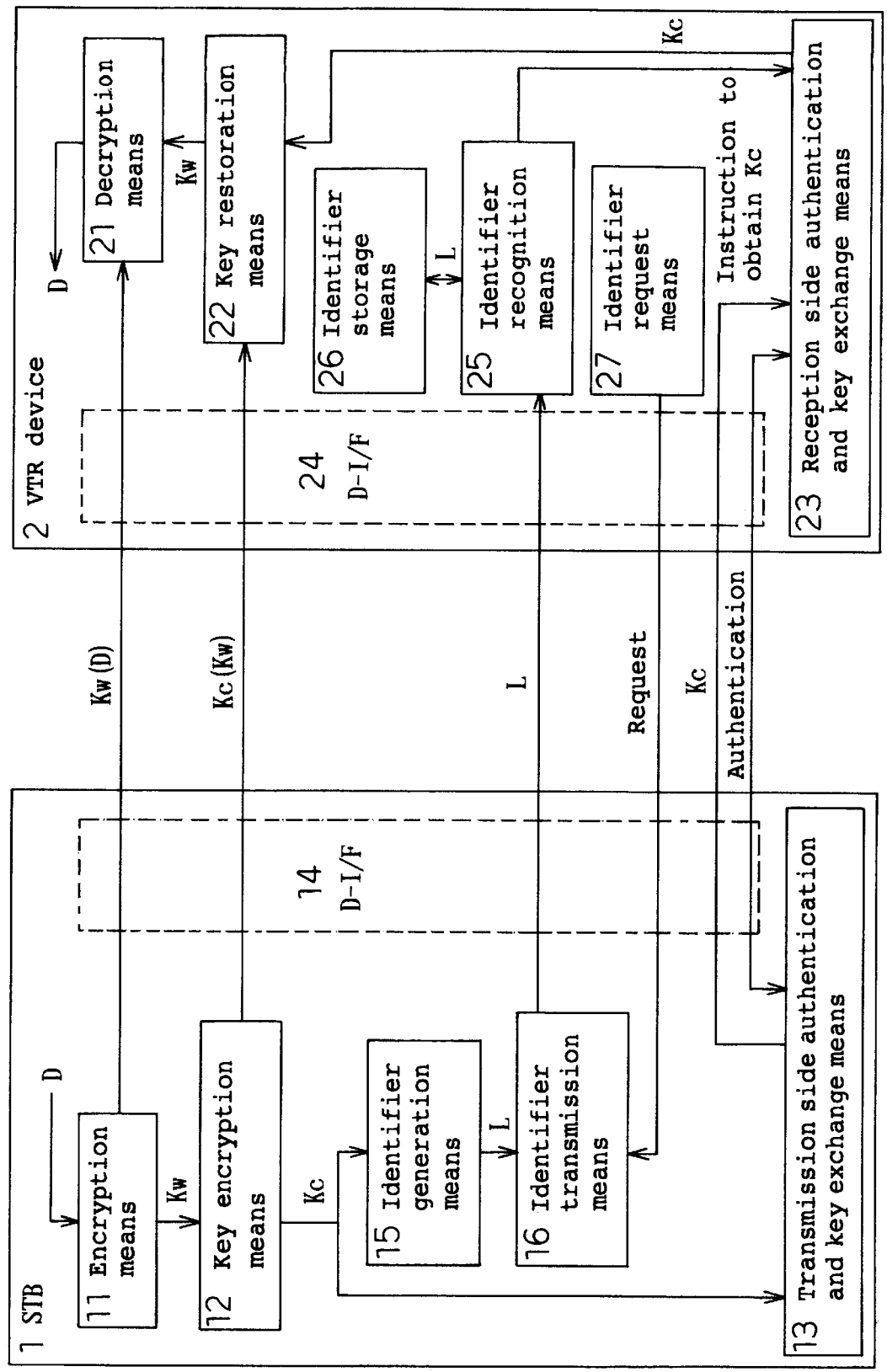
FIG. 1 shows a configuration of the data transmission and reception system according to a first embodiment of the present invention.

FIG. 1 shows the configuration of the data transmission and reception system according to the first embodiment of the present invention. The configuration only shows the components relating to the transmission and reception of data between an STB and a VTR device. The reception means, etc. for receiving data from a satellite in an STB, and recording means, etc. in a recording medium in a VTR device are omitted in the attached drawings. The data transmission and reception system according to the present embodiment transmits and receives data to and from a VTR device for recording satellite broadcast data from an STB for a satellite broadcast, and comprises an STB 1 corresponding to the data transmission apparatus according to the present invention, and a VTR device 2 corresponding to the data reception apparatus according to the present invention.

The STB 1 comprises: encryption means 11 for periodically or non-periodically updating the work key Kw, performing the first encryption process using the work key Kw on the digital data D obtained by converting an electric wave received from a satellite into AV data so that the digital data D can be converted into the encrypted digital data Kw (D), and transmitting the result to the VTR device 2; a key encryption means 12 for periodically or non-periodically updating the control key Kc, performing the second encryption process using the control key Kc on the work key Kw so that the work key Kw can be converted into the encrypted work key Kc (Kw), and transmitting the result to the VTR device 2; a transmission side authentication and key exchange means 13 for performing an authentication and key exchange process with the VTR device 2; a D-I/F (digital interface) 14 for directly transmitting and receiving data to and from a D-I/F 24 of the VTR device 2; identifier generation means 15 for generating an identifier L for specification of the control key Kc; and identifier transmission means 16 for transmitting the identifier L to the VTR device 2.

The VTR device 2 comprises: the D-I/F 24 for directly transmitting and receiving data to and from the D-I/F 14 of the STB 1; a reception side authentication and key exchange means 23 for performing an authentication and key exchange process with the transmission side authentication and key exchange means 13 of the STB 1; key restoration means 22 for decrypting the encrypted work key Kc (Kw) using the control key Kc obtained through the reception side authentication and key exchange means 23; decryption means 21 for decrypting the encrypted digital data Kw (D) using the work key Kw restored by the key restoration means 22, and restoring the digital data D; identifier recognition means 25 for determining whether or not the control key Kc has been updated by referring to an identifier L for specification of the control key Kc transmitted from the STB 1 at least when a receiving operation is resumed after being suspended, and for performing again the authentication and key exchange process on the reception side authentication and key exchange means 23 to obtain an updated control key Kc when it is determined that the control key Kc has been updated; identifier storage means 26 for storing a transmitted identifier L; and identifier request means 27 for requesting the identifier transmission means 16 in the STB 1 to transmit the identifier L when the receiving operation is resumed after being suspended.

A D-I/F of an IEEE 1394 can be a practical example of the D-I/F 14 and 24. It performs two types of transfer, that is, an isochronous transfer appropriate for a transfer of data such as picture, voice, etc. requiring real-time guarantee; and an asynchronous transfer appropriate for a transfer of authentication and commands, etc. data not requiring the guarantee.

The procedure of the method in which the STB 1 encrypts and transmits data, and the VTR device 2 decrypts the encrypted data and uses the decrypted data in this system will be described below by referring to FIGS. 2 and 3.

Figure 2:
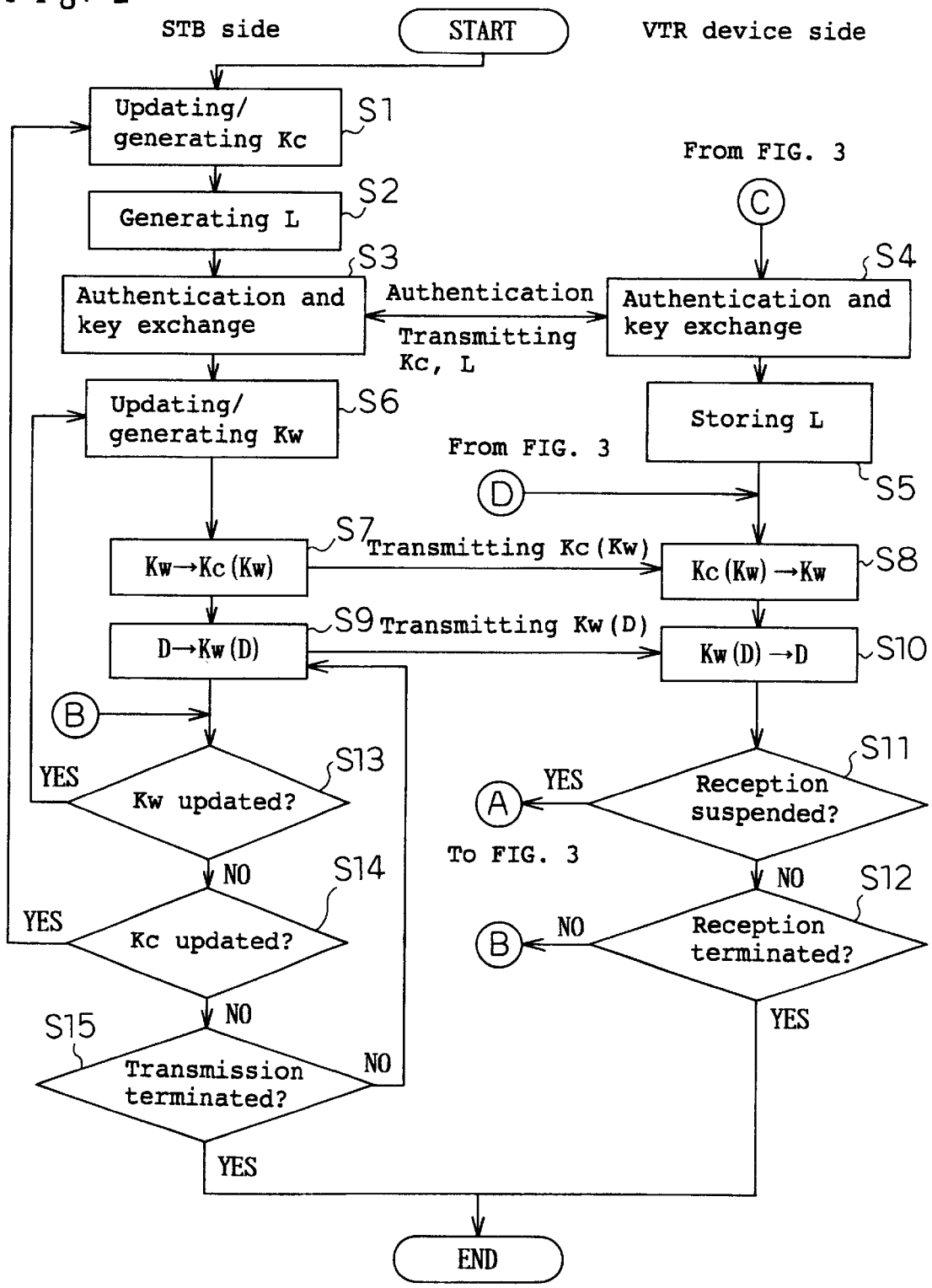
FIG. 2 is a flowchart showing the procedure in the method in which an STB 1 encrypts and transmits data, and a VTR device 2 decrypts the encrypted data and uses the data in the data transmission and reception system according to the first embodiment of the present invention.

First, the procedure used in the normal transmission and reception processes is described by referring to FIG. 2. FIG. 2 is a flowchart showing the procedure of the method in which the STB 1 encrypts and transmits data, and the VTR device 2 decrypts the encrypted data and uses the decrypted data in this system according to the first embodiment of the present invention. In FIG. 2, the process performed by the STB 1 is shown on the left, and the process performed by the VTR device 2 is shown on the right. The transmission and reception of data between the STB 1 and the VTR device 2 is all performed through the D-I/F 14 and 24. However, in the description below, the explanation about the process is omitted.

The key encryption means 12 starts transmitting data and simultaneously generates the control key Kc (step S1), and transmits the key to the transmission side authentication and key exchange means 13 and the identifier generation means 15. The identifier generation means 15 generates an identifier L for specification of the control key Kc, and transmits it to the identifier transmission means 16 (step S2). The transmission side authentication and key exchange means 13 performs the authentication and key exchange process with the reception side authentication and key exchange means 23 to transmit the control key Kc to the VTR device 2 (steps S3 and S4). At this time, the identifier transmission means 16 transmits the identifier L corresponding to the transmitted control key Kc to the identifier recognition means 25. On the VTR device 2 side, the reception side authentication and key exchange means 23 transmits the received control key Kc to the key restoration means 22, and the identifier recognition means 25 transmits the received identifier L to the identifier storage means 26 and stores it therein (step S5). At this time, the identifier storage means 26 overwrites the old identifier L previously stored in the identifier storage means 26.

On the other hand, on the STB 1 side, the encryption means 11 generates the work key Kw (step S6), and transmits it to the key encryption means 12. The key encryption means 12 performs the second encryption process on the work key Kw using the control key Kc generated in step Si, converts it into the encrypted work key Kc (Kw), and transmits it to the key restoration means 22 (step S7). On the VTR device 2 side, the key restoration means 22 decrypts the encrypted work key Kc (Kw) transmitted from the key encryption means 12 using the control key Kc received by the reception side authentication and key exchange means 23 in step S4, restores the work key Kw, and transmits it to the decryption means 21 (step S8).

On the STB 1 side, the encryption means 11 performs the first encryption process on the digital data D obtained by converting the electric wave received from a satellite into AV data using the work key Kw generated in step S6, converts it into the encrypted digital data Kw (D), and transmits the result to the decryption means 21 (step S9). On the side of VTR device 2, the decryption means 21 decrypts the received encrypted digital data Kw (D) using the work key Kw restored in step S8, and restores the digital data D (step S10)

Figure 3:
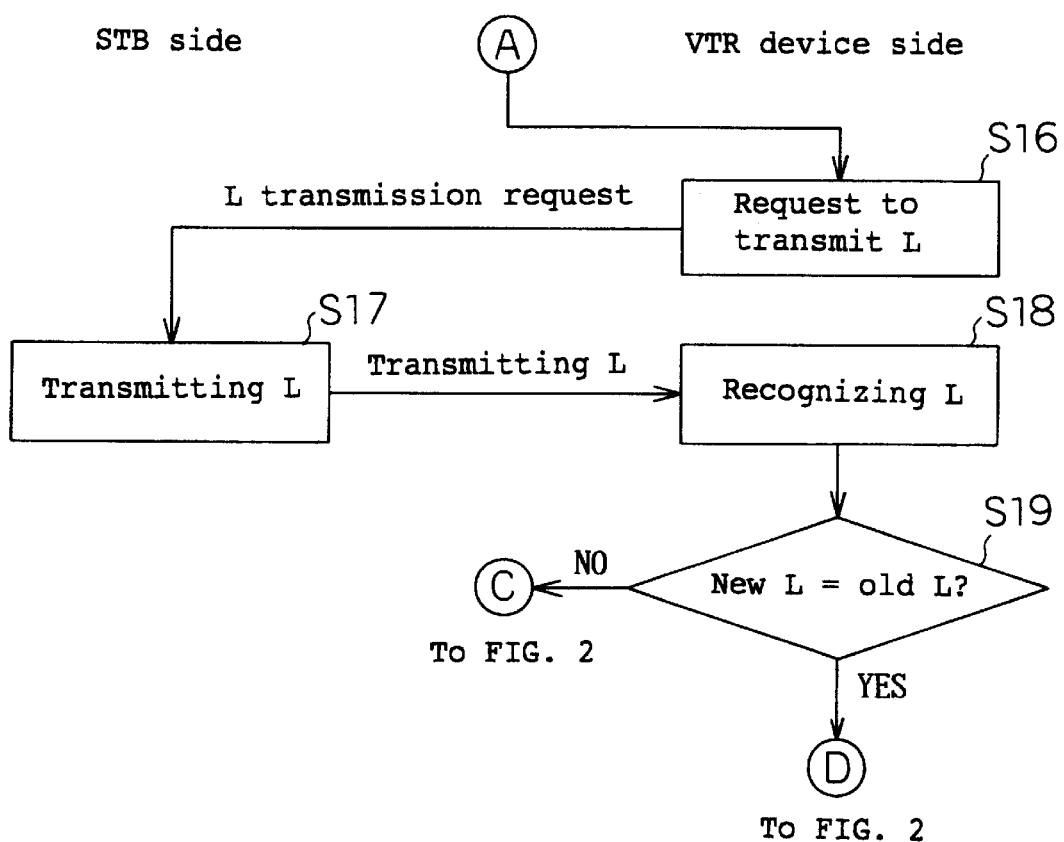
FIG. 3 is a flowchart showing the procedure in which a reception process is suspended, and then the reception is resumed in the data transmission and reception system according to the first embodiment of the present invention.

On the VTR device 2 side, if the reception process is suspended for any reason, and the process has to be resumed, then control is passed to A shown in FIG. 3. If the reception process is not suspended, then control is passed to step S12 (step S11). If the reception process does not terminate, then control is passed to step S13 (step S12). Refer to the explanation described later if the reception process is suspended, and the process is to be resumed.

In step S9, if the data in 1 means has been completed, then it is determined whether or not the work key Kw is to be updated for the next means (step S13). If yes, then control is passed to step S6, and the process similar to that of the above described procedure is performed. If the work key Kw is not updated, then it is determined whether or not the control key Kc is to be updated (step S14). If yes, control is passed to step S1, and the process similar to that of the above described procedure is performed. Provided, there can be the case in which the control key Kc is updated, but the work key Kw is not updated. In this case, the process in step S6 is omitted. When the control key Kc is not updated, control is passed to step S9 (step S15), except the termination of the transmission, and after this, the process similar to that of the above described procedure is performed.

Next, the procedure of resuming the reception process after the process is suspended will be described below by referring to FIG. 3. FIG. 3 is a flowchart of the procedure used when the reception process is resumed after being suspended in the data transmission and reception system according to the first embodiment of the present invention. Also in FIG. 3, as in FIG. 2, the process performed by the STB 1 is shown on the left, and the process performed by the VTR-device 2 is shown on the right. Furthermore, as in FIG. 2, the data transmission and reception between the STB 1 and the VTR device 2 is performed through the D-I/F 14 and 24, but the explanation is also omitted in the following description.

In step S11 shown in FIG. 2, if the reception process is suspended, and is to be resumes, then the identifier request means 27 requests the identifier transmission means 16 to transmit an identifier L (step S16). In response to the request, the identifier transmission means 16 transmits the identifier L to the identifier recognition means 25 (step S17). The identifier recognition means 25 compares in step S5 the transmitted identifier L with the identifier L stored in the identifier storage means 26. If the transmitted identifier L is different from the stored identifier L, then step S4 shown in FIG. 2 is processed. If they match each other, step S8 in FIG. 2 is processed(steps S18 and S19). When step S4 is processed, the reception side authentication and key exchange means 23 performs the authentication and key exchange process with the transmission side authentication and key exchange means 13 at the instruction of the identifier recognition means 25, thereby obtaining the control key Kc corresponding to the transmitted identifier L (step S4). Then, the process similar to that of the procedure shown in FIG. 2 is performed. When step S8 is processed, then the procedure relating to obtaining the control key Kc is not used, but the key restoration means 22 decrypts the encrypted work key Kc (Kw) using the control key Kc corresponding to the stored identifier L which had been used before suspending the reception process, thereby restoring the work key Kw (step S8). Then, the process similar to that of the procedure shown in FIG. 2 is performed.

That is, since the transmission and reception process can be performed on the identifier L without the encryption process, etc., the identifier L is transmitted and received before performing the authentication and key exchange process which requires a heavy load on a system, and then it is determined whether or not the control key Kc has been updated according to the identifier L. Only if it has been updated, the load onto the system can be reduced by performing the authentication and key exchange process.

Figure 4:
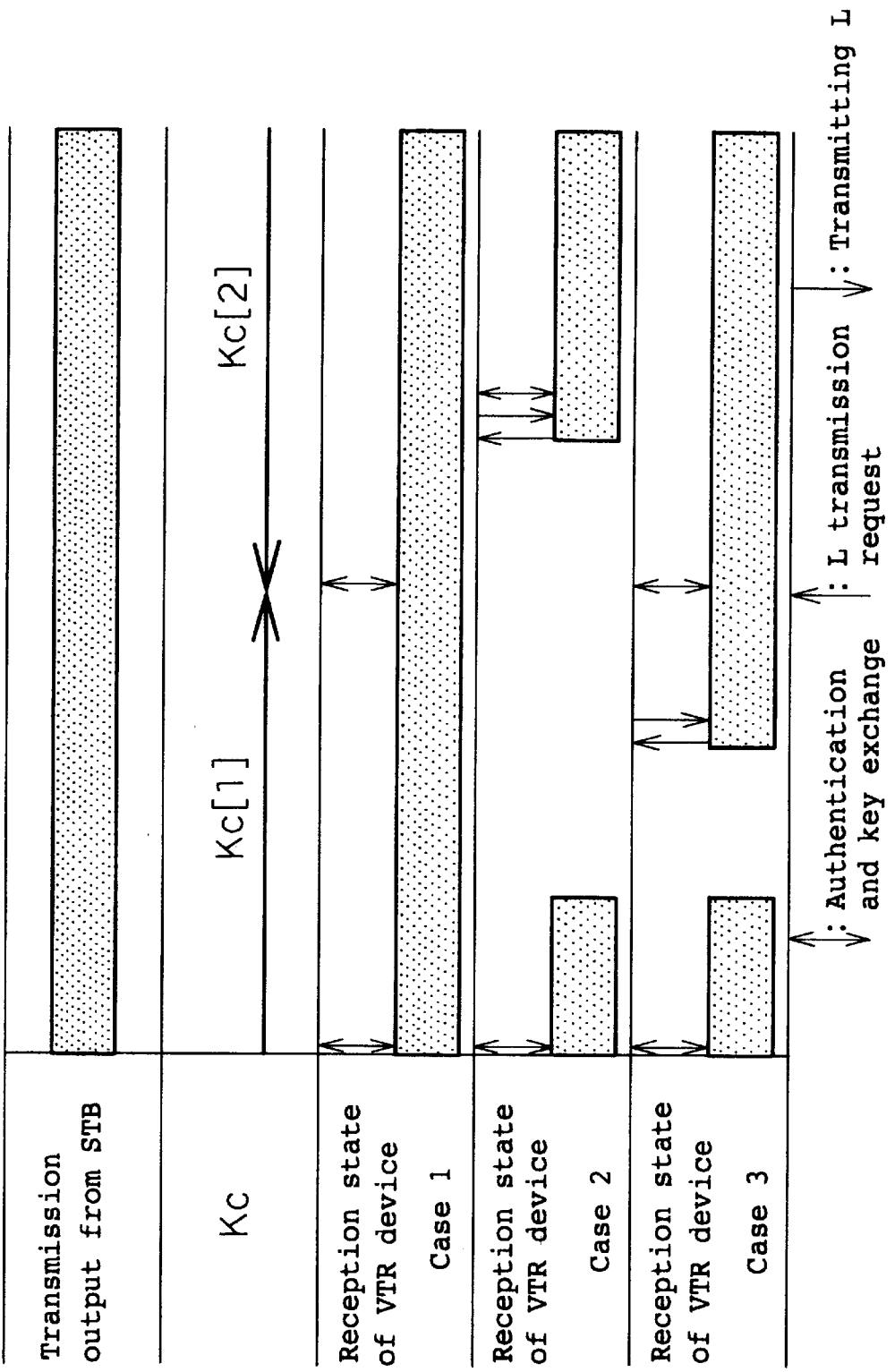
FIG. 4 shows the relationship between the execution of a control key update process and that of an authentication and key exchange process of the data transmission and reception system according to the first embodiment of the present invention.

FIG. 4 shows the execution of relationship between the control key update process and the authentication and key exchange process of the data transmission and reception system according to the first embodiment of the present invention. The horizontal axis indicates the passage of time. The bar in the first row indicates that the STB is transmitting a data signal. The arrow in the second row indicates the range in which the same control key Kc is used. The present Figure shows that Kc [1] is updated into Kc [2]. The bars in the third through fifth rows indicate that the VTR device in each case is in a reception state. The ranges in which the bars are broken indicate that the reception is suspended. The two vertical arrows in the third through fifth rows indicate that the authentication and key exchange process has been performed. The up-arrow indicates that the identifier request means 27 has requested the identifier transmission means 16 to transmit an identifier L. The down-arrow indicates that the identifier transmission means 16 has transmitted an identifier L.

Since the VTR device in case 1 is not suspended after starting the reception process, it performs the authentication and key exchange process after it starts the reception process as in the conventional example. Afterwards, it performs the authentication and key exchange process only when the control key Kc is updated. The VTR device in case 2 is suspended after starting the reception process as in the conventional example, and resumes the reception process after updating the control key Kc. Therefore, it should be confirmed by transmitting an identifier L, and perform again the authentication and key exchange process as in the conventional example. Since the VTR device in case 3 is suspended for a short time, the control key Kc is not updated when the reception process is resumed. Therefore, it is confirmed by transmitting an identifier L, and the key restoration process can be continued without performing again the authentication and key exchange process using the control key Kc used before the reception process is suspended. That is, as compared with the conventional technology, the data transmission and reception system according to the present embodiment can reduce the frequency of performing the authentication and key exchange process which requires a heavy load onto the system.

(Second Embodiment)

The second embodiment of the present invention will be described below with reference to the attached drawings. The point different from the above described first embodiment is that the data reception apparatus according to the present invention does not comprise identifier request means according to the present invention. Therefore, according to the present embodiment, components also used in the above described first embodiment are assigned the same codes, and the detailed explanation is omitted here. In addition, unless specifically described, refer to the descriptions in the first embodiment.

Figure 5:
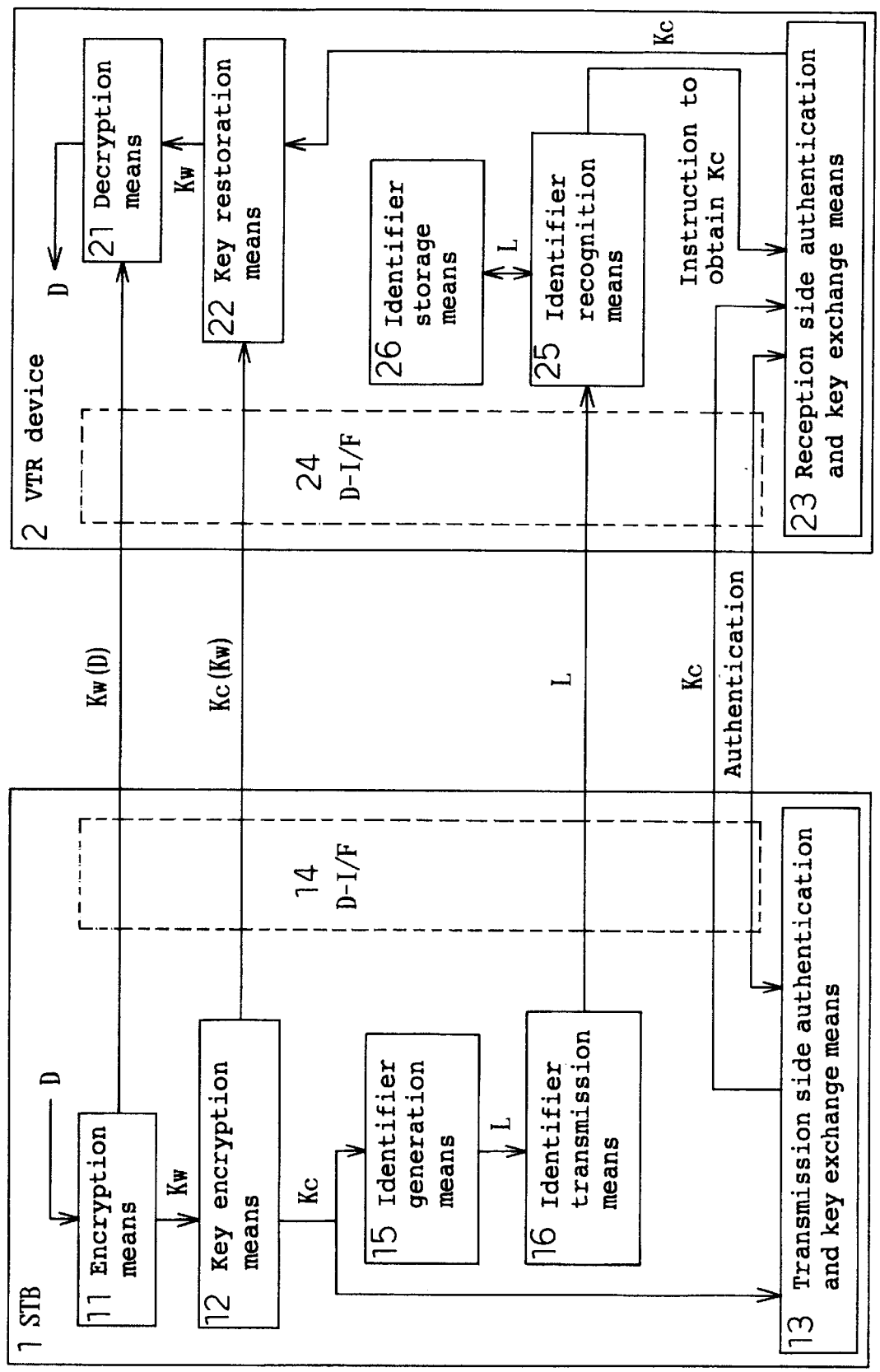
FIG. 5 shows the configuration of the data transmission and reception system according to a second embodiment of the present invention.

FIG. 5 shows the configuration of the data transmission and reception system according to the second embodiment of the present invention. The configuration of the data transmission and reception system according to the present embodiment is different from the configuration of the data transmission and reception system according to the first embodiment shown in FIG. 1 in that the VTR device 2 does not comprise the identifier request means 27, that the encryption means 11 of the STB 1 does not update the work key Kw after the control key Kc is updated until the authentication and key exchange process is completed on the control key Kc; and that the identifier transmission means 16 of the STB 1 has the function of periodically or non-periodically transmitting an identifier L to the VTR device 2.

According to the present embodiment, the identifier transmission means 16 transmits an identifier L to the VTR device 2 each time the work key Kw is updated, and the encrypted work key Kc (Kw) corresponding to the updated work key Kw and simultaneously the identifier L corresponding to the control key Kc at that time are transmitted together. However, the present embodiment is not limited to this application, but the transmission timing can be periodically or non-periodically set only if the updated Kc can be transmitted to the VTR device 2 without fail.

The procedure of the method of the STB 1 encrypting and transmitting data, and the VTR device 2 decrypting and using the encrypted data in the present system will be described below with reference to FIGS. 6 and 7.

First, the procedure used in the normal transmission and reception process will be described with FIG. 6. FIG. 6 is a flowchart showing the procedure of the method of the STB 1 encrypting and transmitting data, and the VTR device 2 decrypting and using the encrypted data in the data transmission and reception system according to the second embodiment of the present invention. In the procedure of the normal transmission and reception process, the different point as compared with steps S1 through S15 shown in FIG. 2 described about the first embodiment is that, when the key encryption means 12 transmits the encrypted work key Kc (Kw) to the key restoration means 22 in step S7, the identifier transmission means 16 transmits an identifier L corresponding to the transmitted Kc to identifier recognition means 25, and that, in step S8, the identifier recognition means 25 transmits the received L to the identifier storage means 26 for storage. Other points are the same as in the first embodiment. Therefore, the detailed explanation is omitted here.

The procedure used when the reception process is suspended and then resumed will be described with reference to FIG. 7. FIG. 7 is a flowchart showing the procedure in which the reception process is suspended and then resumed in the data transmission and reception system according to the second embodiment of the present invention. In FIG. 7, unless specifically described, refer to the descriptions given by referring to FIG. 3.

Figure 6:
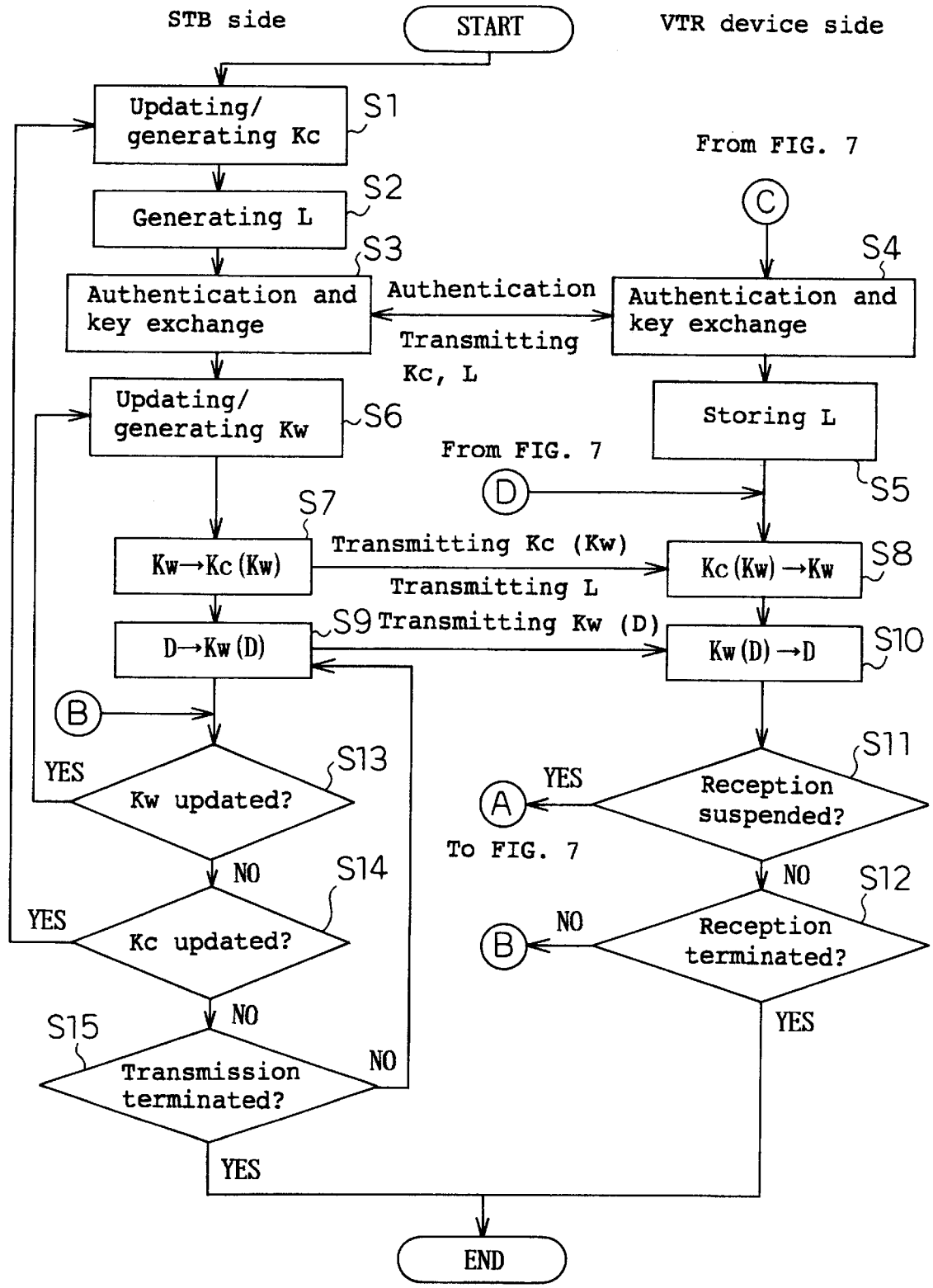
FIG. 6 is a flowchart showing the procedure in the method in which an STB 1 encrypts and transmits data, and a VTR device 2 decrypts the encrypted data and uses the data in the data transmission and reception system according to the second embodiment of the present invention.
Figure 7:
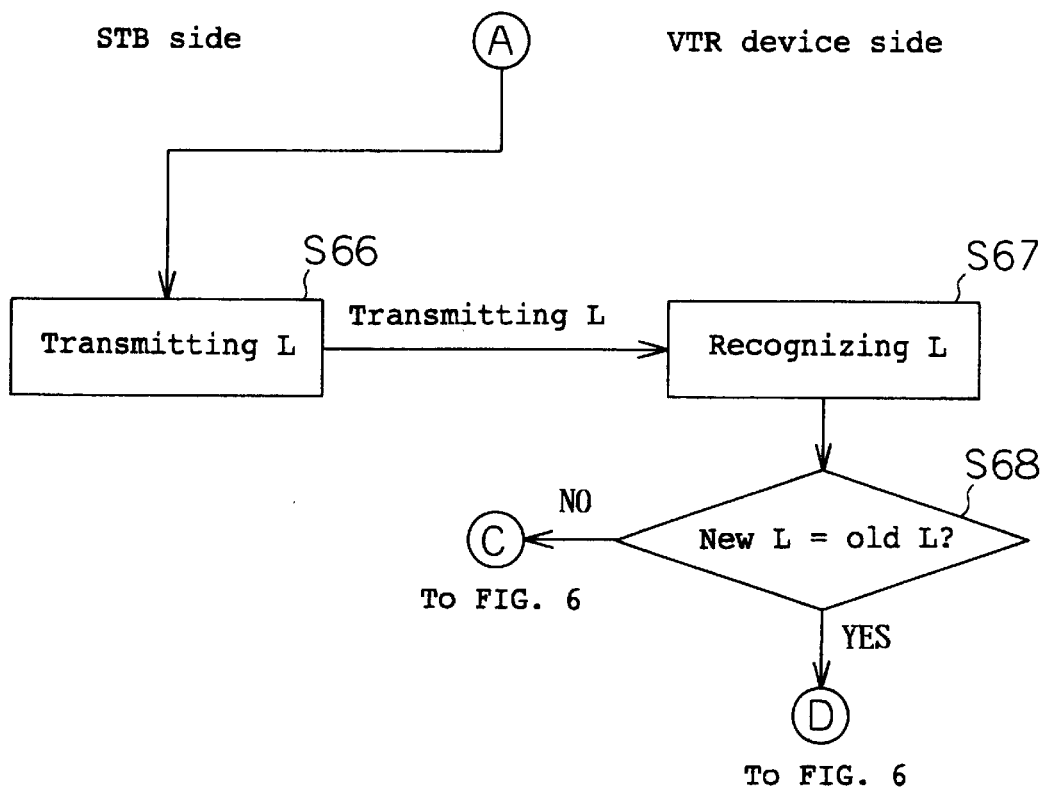
FIG. 7 is a flowchart showing the procedure in which a reception process is suspended, and then the reception is resumed in the data transmission and reception system according to the second embodiment of the present invention.

In step S11 shown in FIG. 6, when the reception process is suspended and then resumed, an active process is not performed on the VTR device 2 side, but data from the STB 1 is waited for. As in the above described step S7, when the key encryption means 12 transmits the encrypted work key Kc (Kw) to the key restoration means 22, the identifier transmission means 16 transmits an L corresponding to the transmitted Kc to the identifier recognition means 25 (step S66). Therefore, the identifier recognition means 25 compares the transmitted L with the L stored in the identifier storage means 26 in step S5 or S8. If the transmitted L is different from the stored L, then control is passed to step S4 shown in FIG. 6. If they match each other, control is passed to step S8 shown in FIG. 6 (steps S67 and S68). When step S4 is processed, the reception side authentication and key exchange means 23 performs the authentication and key exchange process with the transmission side authentication and key exchange means 13 at an instruction from the identifier recognition means 25 to obtain the control key Kc corresponding to the transmitted L (step S4), and then performs the process in the above described procedure shown in FIG. 6. When step S8 is processed, the procedure for obtaining the Kc is not used, but the key restoration means 22 decrypts the encrypted work key Kc (Kw) using the Kc corresponding to the stored L, which had been used before the reception process was suspended, and then restores the work key Kw (step S8). Then, the processes in the procedure shown in FIG. 6 are performed.

That is, since an identifier L can be transmitted or received without an encryption process, etc., the identifier L is transmitted or received before performing the authentication and key exchange process which brings a heavy load onto the system, and it is then determined whether or not the control key Kc has been updated according to the identifier L. Only if it has been updated, the authentication and key exchange process is performed to reduce the load onto the system.

In addition, according to the present embodiment, the encryption means 11 of the STB 1does not update the work key Kw until the authentication and key exchange process has been completed on the updated control key Kc after the control key Kc was updated, thereby preventing the demerit that the update result of the Kw cannot be obtained during the authentication and key exchange process.

Figure 8:
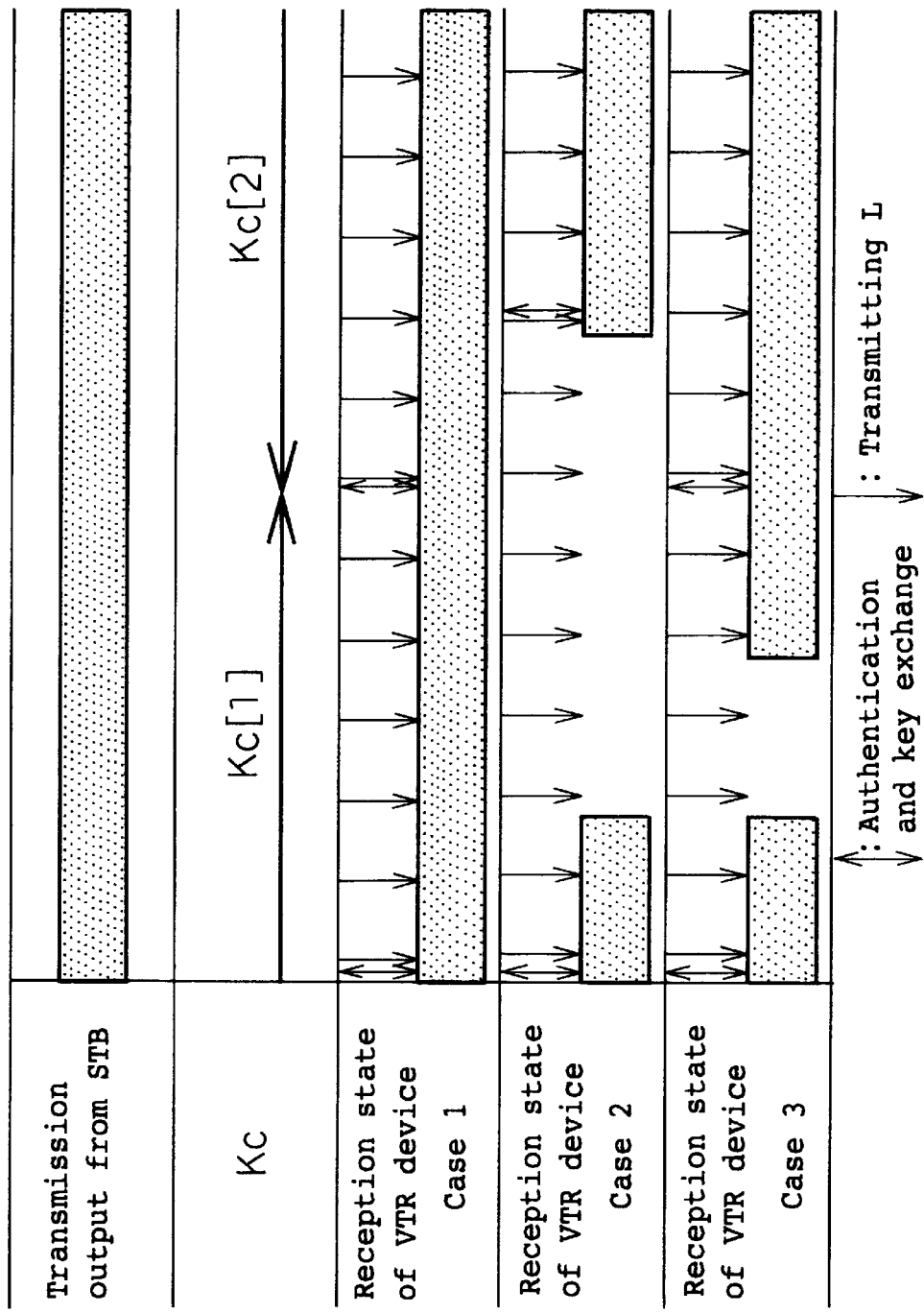
FIG. 8 shows the relationship between the execution of a control key update process and that of an authentication and key exchange process of the data transmission and reception system according to the second embodiment of the present invention.

FIG. 8 shows the relationship between the execution of the control key update process and that of the authentication and key exchange process of the data transmission and reception system according to the second embodiment of the present invention. The horizontal axis indicates the passage of time. The bar in the first row indicates that the STB is transmitting a data signal. The arrow in the second row indicates the range in which the same control key Kc is used. The present Figure shows that control key Kc [1] is updated into control key Kc [2] in the middle of the process. The bars in the third through fifth rows indicate that the VTR device in each case is in a reception state. The ranges in which the bars are broken indicate that the reception is suspended. The two vertical arrows in the third through fifth rows indicate that the authentication and key exchange process has been performed. The down-arrow indicates that the identifier transmission means 16 has transmitted an identifier L. As described above, since the identifier transmission means 16 has transmitted an L corresponding to the Kc to be transmitted to the identifier recognition means 25 when the key encryption means 12 transmits the encrypted work key Kc (Kw) to the key restoration means 22, the down-arrow indicating this frequently occurs regardless of the reception state of the VTR device.

Since the VTR device in case 1 is not suspended during the reception process after starting the process, the authentication and key exchange process is performed after starting the reception process as in the conventional example. Afterwards, only the authentication and key exchange process has to be performed when the control key Kc is updated. The VTR device in case 2 is suspended after starting the reception process as in the conventional example, and resumes the reception process after updating the control key Kc. Therefore, it should be confirmed by transmitting an identifier L, and perform again the authentication and key exchange process as in the conventional example. Since the VTR device in case 3 is suspended for a short time, the control key Kc is not updated when the reception process is resumed. Therefore, it is confirmed by transmitting an identifier L, and the key restoration process can be continued without performing again the authentication and key exchange process using the control key Kc used before the reception process is suspended. That is, as compared with the conventional technology, the data transmission and reception system according to the present embodiment can reduce the frequency of performing the authentication and key exchange process which requires a heavy load onto the system in case 3.

The data transmission apparatus of the data transmission and reception system according to the second embodiment has been described as having the function according to claim 7 of the present invention. However, without the function, the effect of improving the transmission and reception efficiency can be realized by reducing the frequency of performing the authentication and key exchange process. Although the data transmission apparatus in the data transmission and reception system according to the first embodiment has the above described function, the effect obtained by the data transmission and reception system according to the second embodiment can also be obtained.

In addition, the data transmission and reception system and the data reception apparatus according to the above described first and second embodiments have been described as comprising the identifier storage means according to the present invention. However, they are not limited to this configuration. That is, the identifier recognition means according to the present invention only has to be configured in such a way at least that it can be determined whether or not the control key has been updated by referring to an identifier, which is transmitted from the data transmission apparatus, for specification of the control key when the reception process is resumed after being suspended.

Furthermore, the data transmitting and receiving method, the data transmission and reception system, the data transmission apparatus, and the data reception apparatus have been described in the first and second embodiments as transmitting and receiving data between the STB of the satellite broadcast and the VTR device for recording corresponding satellite broadcast data. However, they are not limited to this application. That is, data can be encrypted and transmitted from the transmission side, and the encrypted data can be decrypted and used on the reception side, and the key used to encrypting the data can be transmitted by performing the authentication and key exchange process.

In addition, in the above described first and second embodiments, the data transmission and reception system according to the present invention has been described. The data transmitting and receiving method according to the present invention is also used as described above. In addition, the program recording medium according to the present invention stores a program for directing a computer to perform each of the functions of all or a part of each of the above described methods. For example, it stores a program for directing a computer to perform all or a part of the steps shown in FIGS. 2 and 3, or 6 and 7.

Furthermore, all or a part of each of the means and components in the data transmission and reception system according to the above described first and second embodiments may be hardware or software having the same function as the hardware.

(Third Embodiment)

Described below is the configuration of the AV contents communications system according to the third embodiment of the present invention.

Figure 9:
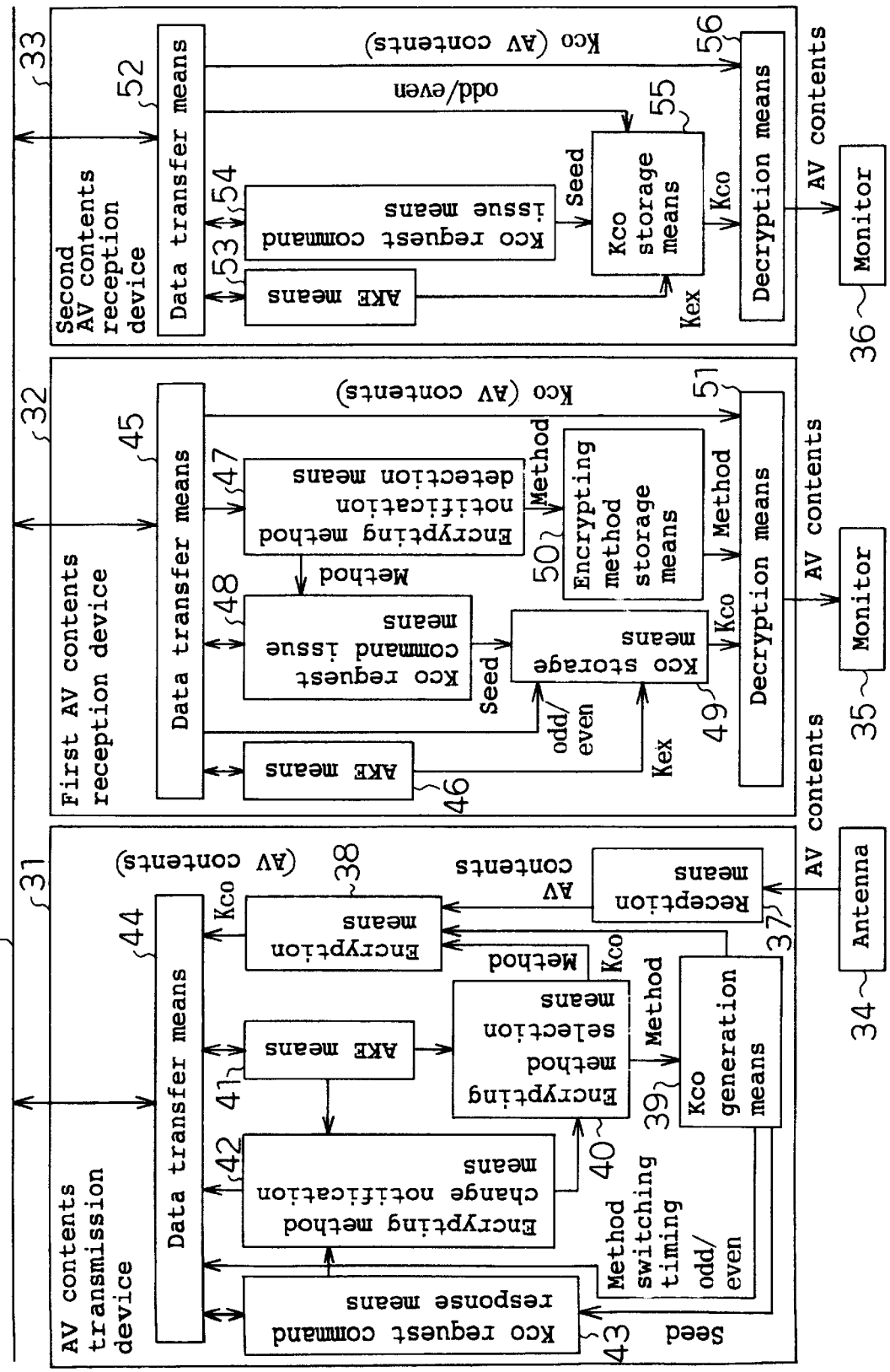
FIG. 9 is a block diagram of an AV contents communications system according to a third embodiment of the present invention.

FIG. 9 is a block diagram showing the AV contents communications system according to the third embodiment of the present invention. As shown in FIG. 9, the AV contents communications system according to the third embodiment of the present invention comprises an AV contents transmission device 31, a first AV contents reception device 32, a second AV contents reception device 33, and an IEEE 1394 bus. FIG. 9 also shows an antenna 34, and monitors 35 and 36.

The AV contents transmission device 31 comprises reception means 37, encryption means 38, Kco generation means 39, encrypting method selection means 40, AKE means 41, encrypting method change notification means 42, Kco request command response means 43, and data transfer means 44 as shown in FIG. 9.

The reception means 37 receives AV contents through an anntena 34 external to the AV contents transmission device 31.

The encryption means 38 can use a basic encrypting method and an extended encrypting method, and inputs the AV contents from the reception means 37, also inputs an encryption key Kco from the Kco generation means 39, uses the encrypting method selected by the encrypting method selection means 40, and encrypts the AV contents using the encryption key Kco. In addition, the AV contents encrypted using the encryption key Kco are defined as Kco (AV contents). The basic encrypting method and the extended encrypting method differ in encryption level. That is, the extended encrypting method has a higher encryption level than the basic encrypting method. In other words, they differ in the length of a digital signal configuring the encryption key Kco for use in the encryption process. For example, the basic encrypting method encrypts AV contents using a 40-bit encryption key Kco while the extended encrypting method encrypts AV contents using a 56-bit encryption key Kco.

The Kco generation means 39 generates an encryption key Kco for use by the encryption means 38 encrypting the AV contents from the reception means 37, and updates the encryption key Kco every 20 seconds.

The encrypting method selection means 40 selects an encrypting method used when the encryption means 38 encrypts AV contents.

The AKE means 41 performs the authentication and key exchange process with the first AV contents reception device 32. If the authentication process has been successfully performed with the first AV contents reception device 32, then an exchange key Kex is issued to the first AV contents reception device 32. Similarly, the AKE means 41 performs the authentication and key exchange process with the second AV contents reception device 33.

When an encrypting method is switched into another encrypting method, the encrypting method change notification means 42 issues a notification of the change.

The Kco request command response means 43 inputs a command from the first AV contents reception device 32 and/or the second AV contents reception device 33 requesting to transmit the seed of the latest encryption key Kco updated every 20 seconds, and transmits the seed of encryption key Kco in response to the command.

The data transfer means 44 communicates data between each of the means of the AV contents transmission device 31 and the first AV contents reception device 32 and/or the second AV contents reception device 33.

The first AV contents reception device 32 comprises data transfer means 45, AKE means 46, encrypting method notification detection means 47, Kco request command issue means 48, Kco storage means 49, encrypting method storage means 50, and decryption means 51 as shown in FIG. 9.

The data transfer means 45 communicates data between each of the means of the first AV contents reception device 32 and the AV contents transmission device 31.

The AKE means 46 performs the authentication and key exchange process with the AV contents transmission device 31. If the authentication process has been successfully performed with the AV contents transmission device 31, then an exchange key Kex is received from the AV contents transmission device 31.

The encrypting method notification detection means 47 detects which encrypting method is used in encrypting the AV contents from the AV contents transmission device 31.

The Kco request command issue means 48 issues a command requesting the AV contents transmission device 31 to transmit the seed of encryption key Kco corresponding to an encrypting method detected by the encrypting method notification detection means 47. In addition, the Kco request command issue means 48 receives the seed of encryption key Kco from the AV contents transmission device 31.

The Kco storage means 49 has a predetermined function required when encrypted AV contents from the AV contents transmission device 31 are decrypted, inputs the exchange key Kex from the AKE means 46, also inputs the seed of the encryption key Kco from the Kco request command issue means 48, and substitutes the exchange key Kex and the encryption key Kco for a predetermined function to generate and store an encryption key Kco. Besides, description regarding the function will be made later.

The encrypting method storage means 50 stores the encrypting method detected by the encrypting method notification detection means 47.

The decryption means 51 inputs the encrypted AV contents from the AV contents transmission device 31, also inputs the encryption key Kco from the Kco storage means 49 and the encrypting method from the encrypting method storage means 50, and decrypts the encrypted AV contents using the encryption key Kco according to the encrypting method. The decryption means 51 can use either the basic encrypting method or the extended encrypting method.

Next, the second AV contents reception device 33 comprises data transfer means 52, AKE means 53, Kco request command issue means 54, Kco storage means 55, and decryption means 56 as shown in FIG. 9.

The data transfer means 52 communicates data between each of the means of the second AV contents reception device 33 and the AV contents transmission device 31.

The AKE means 53 performs the authentication and key exchange process with the AV contents transmission device 31. If the authentication process has been successfully performed between the AKE means 53 and the AV contents transmission device 31, then the AKE means 53 inputs an exchange key Kex from the AV contents transmission device 31.

The Kco request command issue means 54 issues a command to the AV contents transmission device 31 to transmit the seed of the encryption key Kco corresponding to the basic encrypting method. In addition, the Kco request command issue means 54 inputs the seed of the latest encryption key Kco from the AV contents transmission device 31 in response to the request command.

The Kco storage means 55 has a predetermined function required in decrypting the encrypted AV contents from the AV contents transmission device 31, inputs the seed of encryption key Kco from the Kco request command issue means 54, also receives the exchange key Kex from the AKE means 53, and substitutes the exchange key Kex and the encryption key Kco for a preliminarily set function to generate and store the encryption key Kco.

The decryption means 56 inputs the encrypted AV contents from the AV contents transmission device 31, also inputs the encryption key Kco from the Kco storage means 55, and decrypts the encrypted AV contents using the encryption key Kco on the basis of the basic encrypting method. It is assumed that the decryption means 56 can use only the basic encrypting method. That is, the decryption means 56 cannot use the extended encrypting method.

Next, the IEEE 1394 bus is a transmission line of data communicated among the AV contents transmission device 31, the first AV contents reception device 32, and the second AV contents reception device 33.

An antenna 34 is provided outside the AV contents transmission device 31, and receives the AV contents. The monitor 35 displays the AV contents from the first AV contents reception device 32. Similarly, the monitor 36 displays the AV contents from the second AV contents reception device 33.

Described below are the operations of the AV contents communications system according to the third embodiment of the present invention.

Before describing in detail the operations of the AV contents communications system shown in FIG. 9, the following situation is assumed for convenience, and the operations of the AV contents communications system are described under the situation.

First, assume that the AV contents transmission device 31 encrypts the AV contents from the antenna 34 in the extended encrypting method, outputs the result through the IEEE 1394 bus, and the first AV contents reception device 32 receives and decrypts the AV contents during the output process of the AV contents, and then the second AV contents reception device 33 which cannot use the extended encrypting method receives the AV contents and tries to decrypt them.

Described first are the operations of the AV contents transmission device 31 which encrypts the AV contents from the antenna 34 in the extended encrypting method, and then outputs the result through the IEEE 1394 bus. The AV contents transmission device 31 can use either the extended encrypting method or the basic encrypting method as described above. However, unless specifically requested to output the AV contents encrypted in the basic encrypting method, the extended encrypting method having a stronger encryption effect is used in encrypting the AV contents with the view to more strongly protect the output AV contents.

Figure 10A:
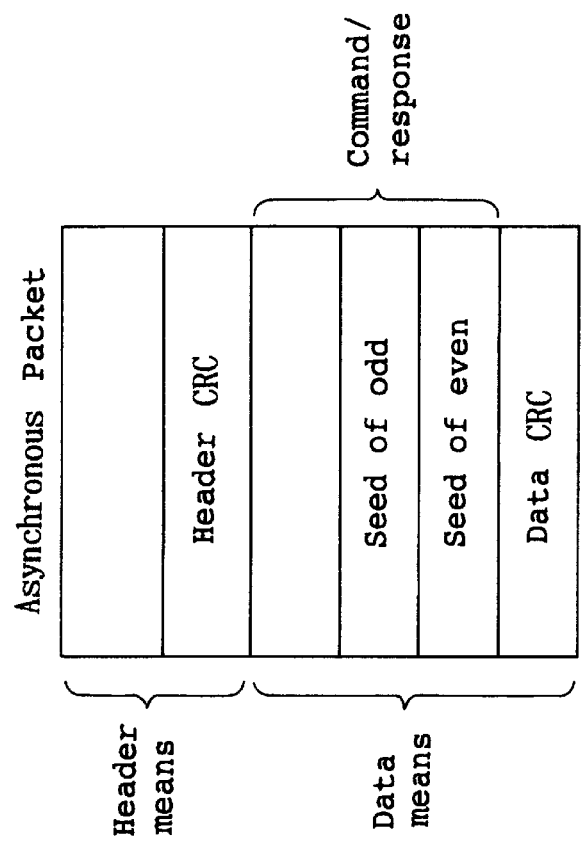
FIG. 10 shows the configuration of the data containing AV contents and a command transmitted by an AV contents transmission device 31 of the AV contents communications system according to the third embodiment of the present invention.
Figure 10B:
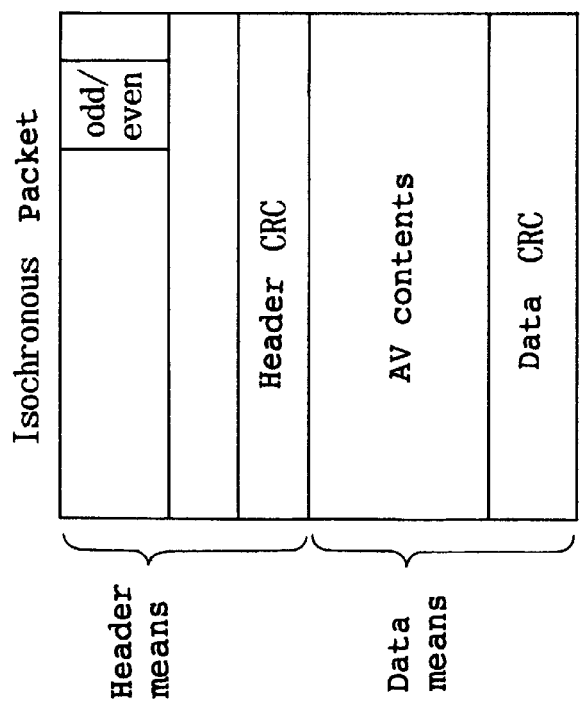

First, the encrypting method selection means 40 selects the extended encrypting method, the reception means 37 receives the AV contents through the antenna 34 external to the AV contents transmission device 31, and the encryption means 38 inputs the AV contents from the reception means 37, also receives an encryption key Kco1 from the Kco generation means 39, and then encrypts the AV contents using the encryption key Kco1 in the extended encrypting method. To indicate that the encryption key from the Kco generation means 39 as an encryption key corresponding to the extended encrypting method, it is described as "Kco1". In the following descriptions, the encryption key corresponding to the basic encrypting method other than the extended encrypting method is described as "Kco2". The encryption process is not performed on, for example, a part of the headers of the AV contents. That is, it is assumed that the encryption process is performed such that, when the AV contents are received, the header information about the AV contents may be decrypted without the encryption key Kco1, but the AV contents cannot be decrypted without the encryption key Kco1. In addition, the encryption key Kco1 from the Kco generation means 39 to be used by the encryption means 38 is updated every 20 seconds as described above. Then, the Kco generation means 39 outputs "odd" or "even" as the information as to the timing of the update using the encryption key Kco1. When the "odd" and "even" is switched from each other, each indicates that the encryption key Kco1 used in encrypting the AV contents is switched every 20 seconds before and after the switch between "odd" and "even". Then, the data transfer means 44 inputs the AV contents encrypted using the encryption key Kco1 from the encryption means 38, that is, the Kco (AV contents), also receives "odd" or "even" from the Kco generation means 39, adds "odd" or "even" to the header of the Kco (AV contents) as shown in FIG. 10(*a*), and outputs the result to the IEEE 1394 bus. FIG. 10(*a*) shows the configuration of the AV contents transmitted from the AV contents transmission device 31. FIG. 10(*b*) is described later.

Next, as described above, the operations of the AV contents transmission device 31 and the first AV contents reception device 32 up to the point when the first AV contents reception device 32 decrypts the AV contents during the output process of the AV contents encrypted and output through the IEEE 1394 bus by the AV contents transmission device 31.

At this time, the AKE means 46 of the first AV contents reception device 32 issues an authentication request to the AKE means 41 of the AV contents transmission device 31, and the AKE means 46 and the AKE means 41 authenticate each other's device. If the authentication process can be successfully performed, then the AKE means 41 outputs an exchange key Kex to the AKE means 46. The exchange key Kex is required in decrypting the encrypted AV contents. Simultaneously, the AKE means 41 determines that the first AV contents reception device 32 can use the extended encrypting method, and does not change the encrypting method. If the AKE means 46 and the AKE means 41 fail in the authentication process, the AKE means 41 does not output the exchange key Kex to the AKE means 46. In this example, it is assumed for convenience of the following description that the AKE means 46 and the AKE means 41 can successfully perform the authentication process.

Then, the AKE means 46 of the first AV contents reception device 32 receives the exchange key Kex from the AKE means 41 through the data transfer means 45, and outputs it to the Kco storage means 49. The encrypting method notification detection means 47 detects that the AV contents from the AV contents transmission device 31 have been encrypted in the extended encrypting method, and outputs the information, that is, the extended encrypting method, to the encrypting method storage means 50 for storage. Furthermore, the Kco request command issue means 48 issues to the Kco request command response means 43 of the AV contents transmission device 31 a command to transmit the seed of the latest encryption key Kco1 corresponding to the extended encrypting method. Then, it receives the seed of the latest encryption key Kco1 from the Kco request command response means 43 in response to the command, and outputs the seed to the Kco storage means 49. As described above, since the encryption key Kco1 from the AV contents transmission device 31 is updated every 20 seconds, the Kco request command issue means 48 is assumed to issue a command to the Kco request command response means 43 every 20 seconds. Then, the Kco storage means 49 substitutes the exchange key Kex from the AKE means 46 and the seed of encryption key Kco1 from the Kco request command issue means 48 for the predetermined functions as described later (equation 1), and generates and stores the encryption key Kco1. In addition, the seed of the encryption key Kco1 is substituted for the seed in Equation 1.

$$Kco = f(seed, Kex) \qquad [\text{Equation 1}]$$

Then, the "odd" or "even" in the header of the Kco (AV contents) from the AV contents transmission device 31 is detected, the switch between the "odd" and "even" is determined, and then it is determined which encryption key Kco1 has been used to encrypt the Kco (AV contents) from the AV contents transmission device 31. As described above, the switch between "odd" and "even" indicates the switch of the encryption key Kco1 used in encrypting the AV contents. Furthermore, when the Kco request command response means 43 of the AV contents transmission device 31 receives a command to request to send the seed of the encryption key Kco1 from the Kco request command issue means 48, it outputs the seed of the encryption key Kco1 to the data transfer means 44. Then, the data transfer means 44 outputs a command containing the seed of encryption key Kco1 used in the Kco (AV contents) to the IEEE 1394 bus by using an asynchronous signal other than the Kco (AV contents) as shown in FIG. 10(*b*). FIG. 10(*b*) shows the configuration of the command transmitted from the AV contents transmission device 31.

Finally, the decryption means 51 inputs the encrypted AV contents from the AV contents transmission device 31 through the data transfer means 45, also inputs the encryption key Kco1 from the Kco storage means 49 and the extended encrypting method from the encrypting method storage means 50, decrypts the encrypted AV contents using the encryption key Kco1 based on the extended encrypting method, and outputs the result to the monitor 35. Then, the monitor 35 displays the AV contents from the decryption means 51.

Described next are the operations of the AV contents transmission device 31, the first AV contents reception device 32, and the second AV contents reception device 33 performed when the second AV contents reception device 33 incapable of using the extended encrypting method decrypts the AV contents when, as described above, the AV contents transmission device 31 encrypts and outputs the AV contents in the extended encrypting method, and the first AV contents reception device 32 decrypts the AV contents. At this time, the operations of the AV contents transmission device 31 are described also with reference to the flowchart shown in FIG. 11.

Figure 11:
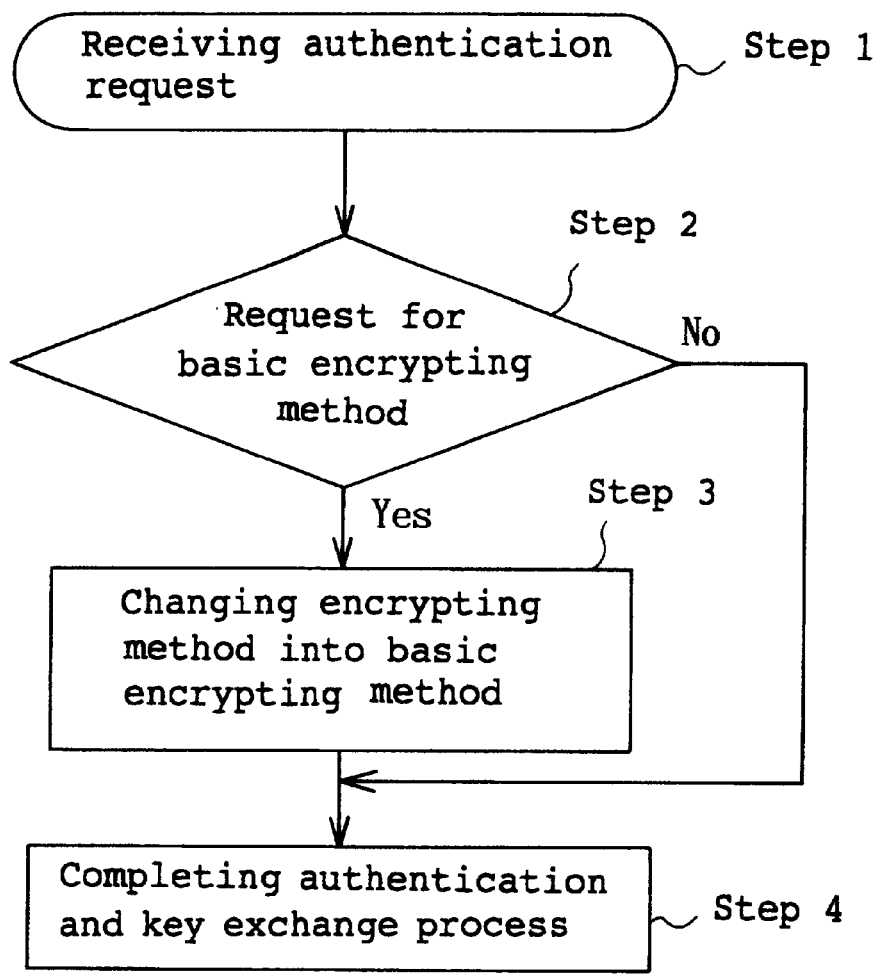
FIG. 11 is a flowchart showing a part of the operations of the AV contents transmission device 31 of the AV contents communications system according to the third embodiment of the present invention.

The AKE means 53 of the second AV contents reception device 33 issues an authentication request to the AKE means 41 of the AV contents transmission device 31, and the AKE means 53 and the AKE means 41 authenticate each other's devices (step 1 shown in FIG. 11). At this time, the AKE means 53 requests to change the encrypting method for the AV contents output by the AV contents transmission device 31 into the basic encrypting method, because the second AV contents reception device 33 cannot use the extended encrypting method, but can use only the basic encrypting method. The mutual authentication process can be successfully performed, then the AKE means 41 accepts the request (step 2 shown in FIG. 11), and outputs the information for control of the encrypting method selection means 40 and the encrypting method change notification means 42 to set the basic encrypting method as an encrypting method (step 3 shown in FIG. 11). Then, the AKE means 41 outputs the exchange key Kex to the AKE means 53, and the authentication and key exchange process between the AKE means 41 and the AKE means 53 can be completed (step 4 shown in 11). The exchange key Kex is a key required when the encrypted AV contents are decrypted. When the authentication process performed by the AKE means 53 and the AKE means 41 cannot be successfully performed, the AKE means 41 does not output the exchange key Kex to the AKE means 53, nor does it accept the request to set the basic encrypting method as an encrypting method. However, it is assumed for convenience of the following description that the authentication process between the AKE means 53 and the AKE means 41 can be successfully performed.

In the AV contents transmission device 31, the encrypting method selection means 40 selects the basic encrypting method according to the information for changing the encrypting method from the AKE means 41, that is, the information for setting the basic encrypting method as an encrypting method, and the information is output to the encryption means 38 and the Kco generation means 39. The encrypting method selection means 40 selects the basic encrypting method by the completion of the authentication and key exchange process between the AKE means 41 and the AKE means 53, that is, by the input of the exchange key Kex at the AKE means 53. Then, after the information for changing the encrypting method into the basic encrypting method has been input, and from the next update timing of the encryption key Kco1 generated in the extended encrypting method, the Kco generation means 39 generates the encryption key Kco2 in the basic encrypting method, and updates it every 20 seconds. Furthermore, the encrypting method change notification means 42 outputs the command to inform that the encrypting method of the AV contents is changed from the extended encrypting method to the basic encrypting method to the encrypting method notification detection means 47 of the first AV contents reception device 32, and outputs a command of the information about the switching timing of the encrypting method to the encrypting method notification detection means 47.

Afterwards, the encryption means 38 of the AV contents transmission device 31 inputs the AV contents from the reception means 37, also inputs the encryption key Kco2 from the Kco generation means 39, and encrypts the AV contents using the encryption key Kco2 in the basic encrypting method. Furthermore, the Kco generation means 39 outputs "odd" or "even" as the information about what timing the encryption key Kco2 is switched. Then, the data transfer means 44 inputs the AV contents encrypted using the encryption key Kco2 from the encryption means 38, that is, Kco (AV contents), also receives "odd" or "even" from the Kco generation means 39, and adds "odd" or "even" to the header of Kco (AV contents) and outputs the result through the IEEE 1394 bus.

When the encrypting method for the AV contents from the AV contents transmission device 31 is switched into the basic encrypting method, the second AV contents reception device 33 is allowed to decrypt the AV contents. Then, the operations of the second AV contents reception device 33 decrypting the AV contents are described below.

First, the AKE means 53 inputs the exchange key Kex from the AKE means 41 of the AV contents transmission device 31 through the data transfer means 52, and outputs it to the Kco storage means 55. The Kco request command issue means 54 issues a command to the Kco request command response means 43 of the AV contents transmission device 31 to transmit the seed of the encryption key Kco2 corresponding to the basic encrypting method, inputs in response to the command the seed of the encryption key Kco2 from the Kco request command response means 43, and outputs the seed to the Kco storage means 55. Then, the Kco storage means 55 substitutes the exchange key Kex from the AKE means 53 and the seed of the encryption key Kco2 from the Kco request command issue means 54 for a predetermined function as described above by the equation 1, and generates and stores the encryption key Kco2. Then, it detects "odd" or "even" from the header of the Kco (AV contents) from the AV contents transmission device 31, determines the switch between "odd" and "even", and specifies which encryption key Kco2 is used to encrypt the Kco ((AV contents) from the AV contents transmission device 31.

Finally, the decryption means 56 receives the encrypted AV contents from the AV contents transmission device 31 through the data transfer means 52, also inputs the encryption key Kco2 from the Kco storage means 55, decrypts the encrypted AV contents using the encryption key Kco2 in the basic encrypting method, and output the result to the monitor 36. The monitor 36 displays the AV contents from the decryption means 56.

Thus, when the AV contents transmission device 31 changes the encrypting method for the AV contents into the basic encrypting method, and encrypts and outputs the AV contents, the second AV contents reception device 33 is allowed to decrypt the AV contents, but the first AV contents reception device 32 which receives and decrypts the AV contents encrypted in the extended encrypting method till then cannot decrypt the AV contents as it is. Described below are the operations of the first AV contents reception device 32 when the AV contents transmission device 31 changes the encrypting method for the AV contents into the basic encrypting method, and when the first AV contents reception device 32 decrypts the AV contents. The operations of the first AV contents reception device 32 are also described by referring to the flowchart shown in 12.

Figure 12:
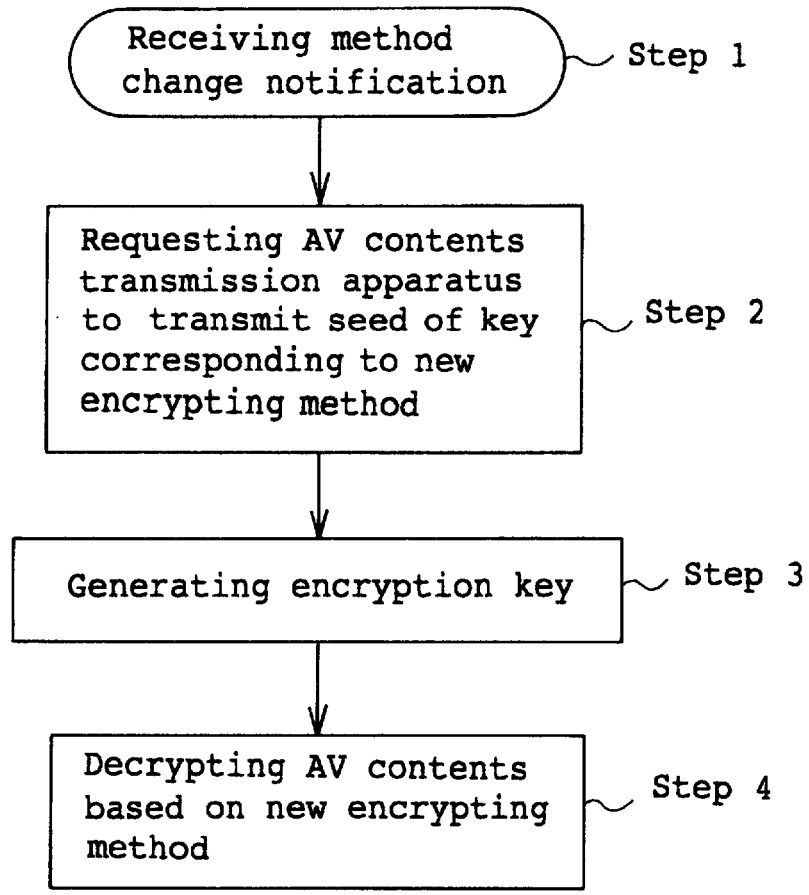
FIG. 12 is a flowchart showing a part of the operations of an first AV contents reception device 32 of the AV contents communications system according to the third embodiment of the present invention.

At this time, as described above, the encrypting method notification detection means 47 of the first AV contents reception device 32 inputs from the encrypting method change notification means 42 of the AV contents transmission device 31 a command informing that the encrypting method for the AV contents is changed from the extended encrypting method to the basic encrypting method, and also inputs a command about the timing of switching the encrypting method (step 1 shown in FIG. 12). The encrypting method notification detection means 47 outputs these two pieces of information to the Kco request command issue means 48 and the encrypting method storage means 50. Then, the Kco request command issue means 48 issues to the Kco request command response means 43 of the AV contents transmission device 31 a command to transmit the seed of the encryption key Kco2 corresponding to the basic encrypting method (step 2 shown in FIG. 12), inputs in return for the command the seed of the encryption key Kco2 from the Kco request command response means 43, and outputs the seed to the Kco storage means 49. Then, the Kco storage means 49 substitutes the exchange key Kex from the AKE means 46 and the seed of the encryption key Kco2 from the Kco request command issue means 48 for a predetermined function, and generates and stores the encryption key Kco2 (step 3 shown in FIG. 12).

Finally, the decryption means 51 receives the encrypted AV contents from the AV contents transmission device 31 through the data transfer means 45, also receives the encryption key Kco2 from the Kco storage means 49 and the basic encrypting method from the encrypting method storage means 50. Since the decryption means 51 can use the basic encrypting method, it decrypts the encrypted AV contents using the encryption key Kco2 in the basic encrypting method, and outputs the result to the monitor 35 (step 4 shown in FIG. 12). Then, the monitor 35 displays the AV contents from the decryption means 51.

Thus, although the AV contents transmission device 31 has changed the encrypting method for the AV contents into the basic encrypting method, the first AV contents reception device 32 can decrypt the encrypted AV contents in the basic encrypting method by receiving the information that the encrypting method has been switched into the basic encrypting method, and the information about the switching timing.

It is possible that the second AV contents reception device 33 stops decrypting the AV contents when the AV contents transmission device 31 changes the encrypting method for the AV contents into the basic encrypting method and transmits the AV contents. Described below are the operations of the AV contents transmission device 31 and the first AV contents reception device 32 performed when the second AV contents reception device 33 stops decrypting the AV contents.

When the second AV contents reception device 33 stops decrypting the AV contents, the Kco request command issue means 54 of the second AV contents reception device 33 stops issuing to the Kco request command response means 43 of the AV contents transmission device 31 a command to transmit the seed of the encryption key Kco2. That is, the Kco request command response means 43 stops receiving a command from the Kco request command issue means 54. When the Kco request command response means 43 stops receiving a command from the Kco request command issue means 54, it is determined that the second AV contents reception device 33 has stopped decrypting the AV contents. Then, the Kco request command response means 43 notifies the encrypting method change notification-means 42 that the second AV contents reception device 33 has stopped decrypting the AV contents.

Then, the encrypting method change notification means 42 inputs the information from the Kco request command response means 43 that the second AV contents reception device 33 has stopped decrypting the AV contents, and according to the information instructs the encrypting method selection means 40 to switch the encrypting method to be selected from the basic encrypting method to the extended encrypting method, and then outputs to the encrypting method notification detection means 47 of the first AV contents reception device 32, the information that the encrypting method is to be switched from the basic encrypting method to the extended encrypting method together with the information about the switching timing. The encrypting method is switched into the extended encrypting method because, as described above, the extended encrypting method has a higher encryption level than the basic encrypting method, and more strongly protects the AV contents from being decrypted by an illegal device than the basic encrypting method. When the encrypting method is switched from the basic encrypting method to the extended encrypting method, the AKE means 41 is preliminarily designed to store the information that the second AV contents reception device 33 can use only the basic encrypting method, and then, the encrypting method change notification means 42 is designed to determine that the encrypting method is to be switched from the basic encrypting method to the extended encrypting method when the second AV contents reception device 33 stops decrypting the AV contents.

Then, the encrypting method selection means 40 switches again the selection of the encrypting method from the basic encrypting method to the extended encrypting method. Thus, after the encrypting method has been switched into the extended encrypting method, each of the means in the AV contents transmission device 31 performs the same operations as those performed when AV contents are encrypted and output based on the extended encrypting method before switching into the basic encrypting method as described above.

On the other hand, in the first AV contents reception device 32, the encrypting method notification detection means 47 inputs from the encrypting method change notification means 42 of the AV contents transmission device 31 the information that the encrypting method is to be switched from the basic encrypting method to the extended encrypting method together with the information about the switching timing. According to the information, each of the means switches their operations in the decryption process. The switching timing is the same as that when the encrypting method is switched from the extended encrypting method to the basic encrypting method. After the switching process, each of the means of the first AV contents reception device 32 operates as in the process similar to that of decrypting the encrypted AV contents in the extended encrypting method before switching into the basic encrypting method as described above.

Thus, when the AV contents transmission device 31 is encrypting the AV contents in the basic encrypting method and transmitting the result, and when the second AV contents reception device 33 stops decrypting the AV contents, the AV contents transmission device 31 makes a change such that the AV contents encrypted in the extended encrypting method having a higher encryption level can be transmitted. However, the first AV contents reception device 32 can decrypt the AV contents although the encrypting method has been thus changed from the basic encrypting method to the extended encrypting method.

The above described third embodiment, the encrypting method change notification means.42 of the AV contents transmission device 31 outputs to the encrypting method notification detection means 47 of the first AV contents reception device 32 a command of the information that the encrypting method of the AV contents is to be changed from the extended encrypting method to the basic encrypting method. However, the encrypting method change notification means 42 may be designed to output to the encrypting method notification detection means 47 the information that the encrypting method for the AV contents is changed from the extended encrypting method to another encrypting method. However, in this case, the encrypting method notification detection means 47 has to request the AV contents transmission device 31 to notify what encrypting method is to be used after a change. Similarly, although the encrypting method change notification means 42 outputs to the encrypting method notification detection means 47 a command of the information about the switching timing from the extended encrypting method to the basic encrypting method, the encrypting method change notification means 42 may also be designed not to output the information about the switching timing of the encrypting method to the encrypting method notification detection means 47. However, in this case, the encrypting method notification detection means 47 has to requests the AV contents transmission device 31 to issue a notification about the switching timing of the encrypting method. In addition, the encrypting method switching information and the switching timing information outputted by the encrypting method change notification means 42 may be provided not only as a command, but also as information added to the AV contents.

According to the above described third embodiment, the AV contents transmission device 31 outputs the information into what encrypting method the current encrypting method is switched, and then, when the first AV contents reception device 32 requests the AV contents transmission device 31 to transmit the seed of the encryption key Kco corresponding to the encrypting method after the switch, transmits the seed of the encryption key Kco in response to the request. However, when the encrypting method is switched, the AV contents transmission device 31 may output the seed of the encryption key Kco corresponding to the encrypting method after the switch together with the information about the encrypting method after the switch. In addition, although the AV contents transmission device 31 outputs the seed of the encryption key Kco, it also may output the encryption key Kco itself, or the encryption key Kco encrypted using the exchange key Kex. In this case, on the reception side, not a seed, but the encryption key Kco itself, or the encryption key Kco encrypted using the exchange key Kex is used. In addition, the seed of the encryption key Kco is transmitted through a command, but the encryption key Kco and the seed thereof may be transmitted either in a command or as the information added to the AV contents for transmission.

In addition, according to the third embodiment described above, the Kco generation means 39 of the AV contents transmission device 31 updates the encryption key Kco every 20 seconds, but the interval of the Kco generation means 39 updating the encryption key Kco is not limited to every 20 seconds. The encryption key Kco may be updated either periodically or non-periodically.

According to the third embodiment described above, the AV contents transmission device 31 stores the second AV contents reception device 33, from where determines whether or not a command for requesting the seed of the encryption key Kco2 for decryption of the AV contents has been received. If the command stops, the encrypting method is switched from the extended encrypting method to the basic encrypting method. However, the AV contents transmission device 31 can check what encrypting method can be used in each of the first AV contents reception device 32 and the second AV contents reception device 33. If all the AV contents reception devices transmitting a command to request the seed of the encryption key Kco for decryption of the AV contents can use the extended encrypting method, then the encrypting method can be switched from the basic encrypting method to the extended encrypting method.

Figure 13:
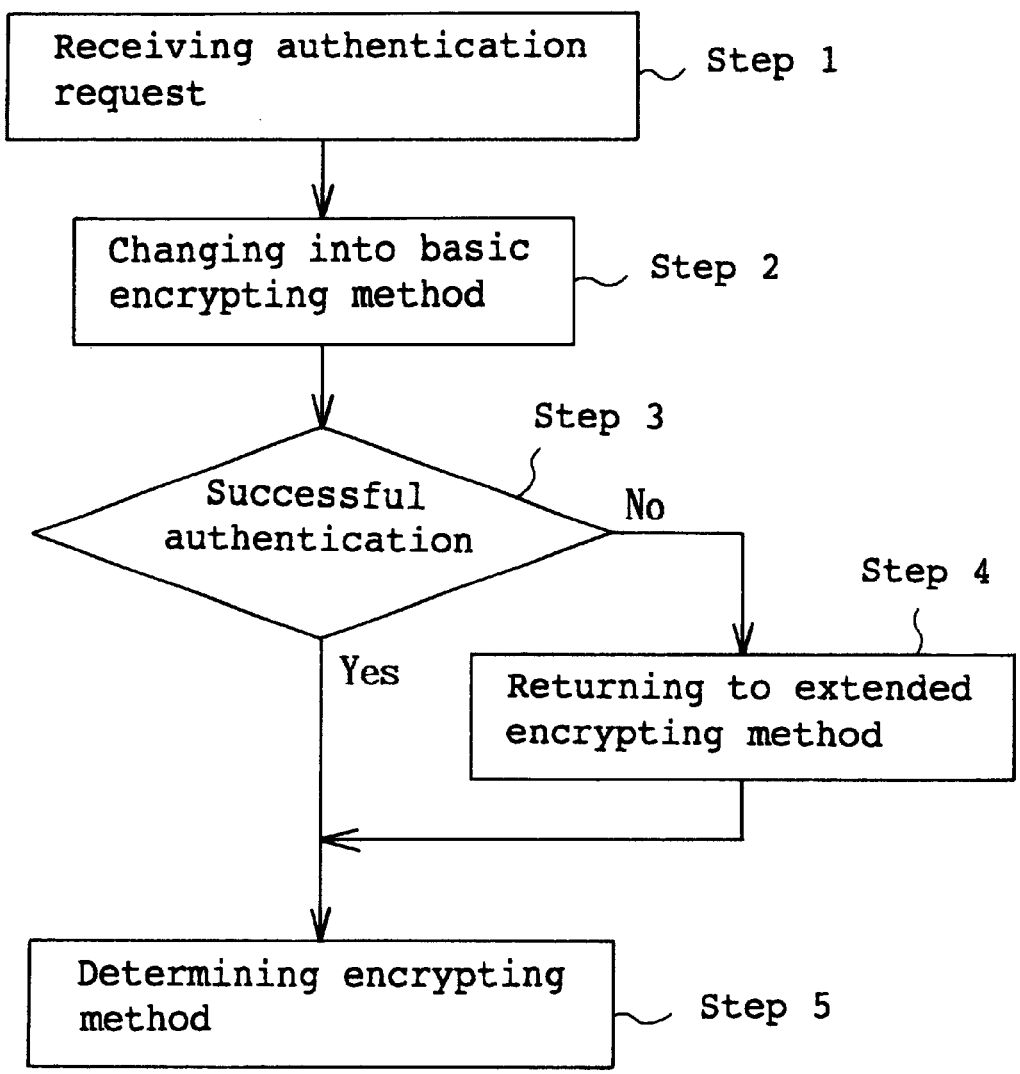
FIG. 13 is another flowchart different from FIG. 11 showing a part of the operations of the AV contents transmission device 31 of the AV contents communications system according to the third embodiment of the present invention.
Figure 14:
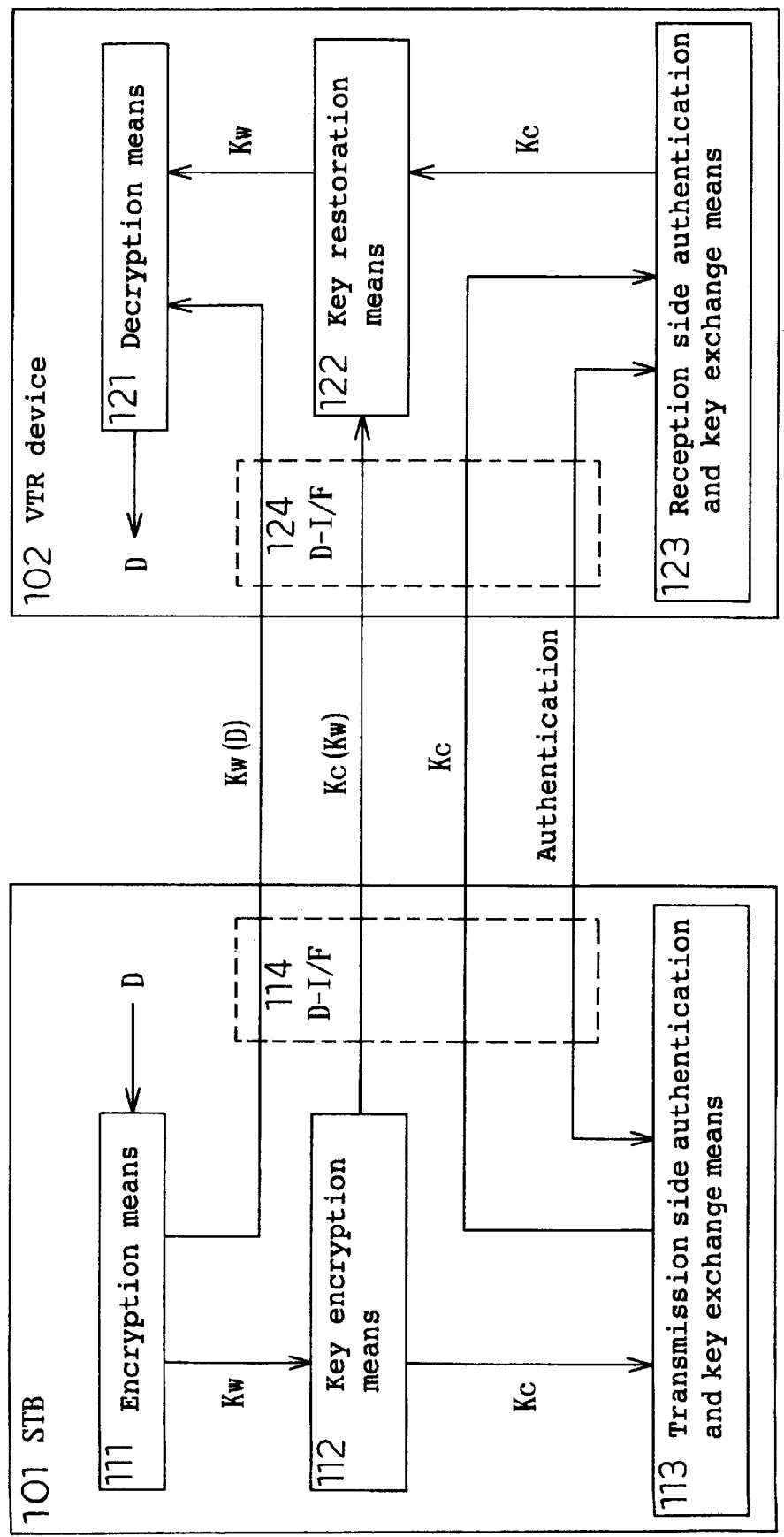
FIG. 14 shows the configuration of the conventional data transmission and reception system.
Figure 15:
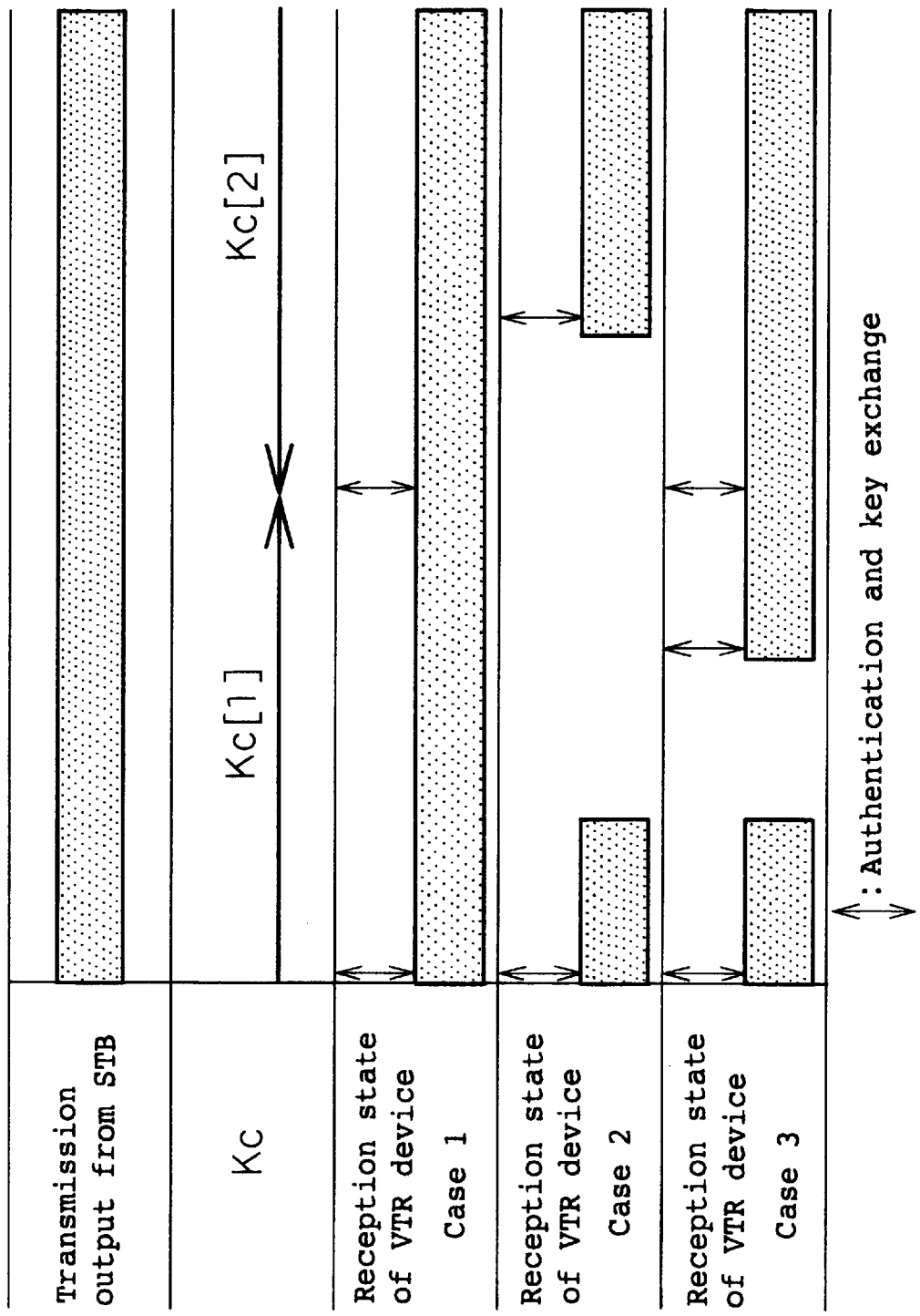
FIG. 15 shows a relationship between the execution of a control key update process and an authentication and that of key exchange process when a control key is updated in the conventional data transmission and reception system.
Figure 16:
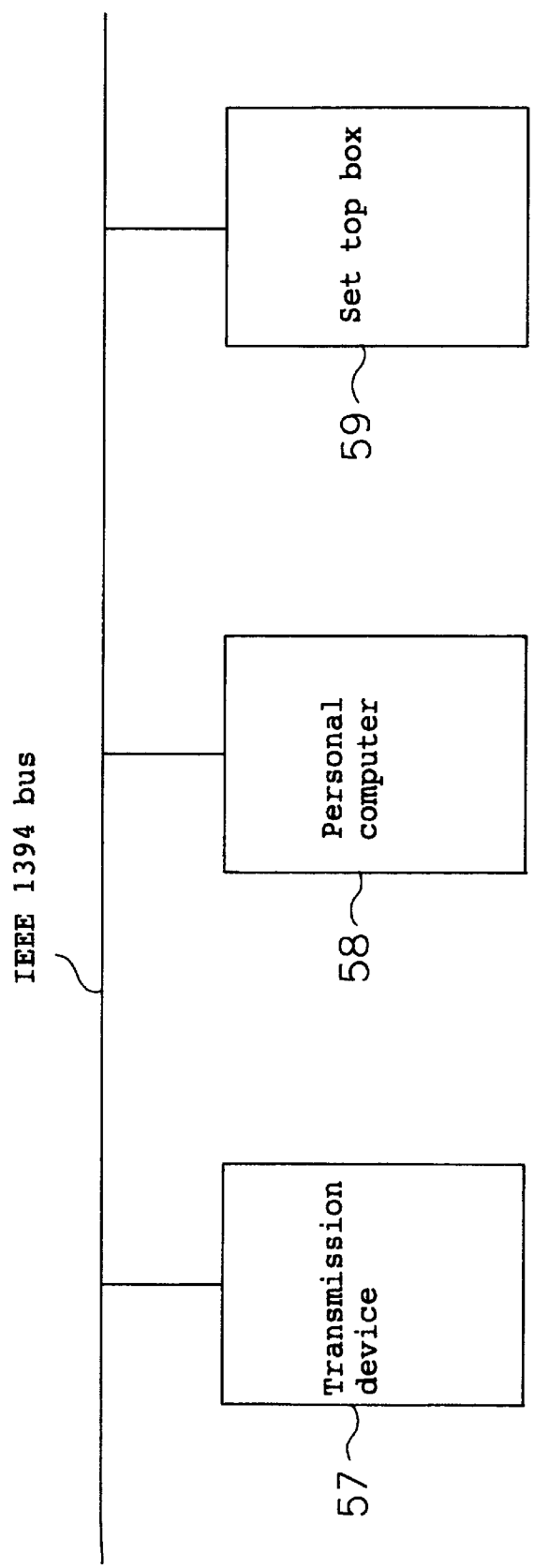
FIG. 16 illustrates the explanation of the problem of the second conventional technology.

In addition, according to the third embodiment described above, when the AV contents transmission device 31 switches the encrypting method from the extended encrypting method to the basic encrypting method, the AV contents transmission device 31 first performs the authentication process with the second AV contents reception device 33. If the process is successfully performed, the encrypting method is switched from the extended encrypting method to the basic encrypting method. However, as shown in 13, after the AV contents transmission device 31 has received the authentication request from the second AV contents reception device 33 (step 1 shown in FIG. 13), the encrypting method is switched from the extended encrypting method to the basic encrypting method (step 2 shown in FIG. 13) regardless of the success of the mutual authentication. If the authentication process can be successfully performed after the switch (step 3 shown in FIG. 13), then the basic encrypting method can be specified (step 5 shown in FIG. 13). If the authentication process in step 3 shown FIG. 13 fails, the encrypting method can be switched from the basic encrypting method to the extended encrypting method (step 4 shown in FIG. 13) In addition, according to the third embodiment described above, the AV contents transmission device 31 performs the authentication process with the second AV contents reception device 33. If the authentication process is successfully performed, the encrypting method is switched from the extended encrypting method to the basic encrypting method. However, when the AV contents transmission device 31 receives an authentication request from the second AV contents reception device 33, it switches the encrypting method from the extended encrypting method to the basic encrypting method regardless of the success of the authentication process, and the AV contents may be encrypted in the switched-to basic encrypting method. However, in this case, if the authentication process fails between the AV contents transmission device 31 and the second AV contents reception device 33, then the AV contents transmission device 31 does not output the exchange key Kex to the second AV contents reception device 33. Therefore, the AV contents from the AV contents transmission device 31 can be protected from being decrypted by an illegal device. On the other hand, when the AV contents transmission device 31 receives an authentication request from the second AV contents reception device 33, and outputs the encrypted AV contents after switching the encrypting method to the basic encrypting method, the first AV contents reception device 32 receives from the AV contents transmission device 31 the information that the encrypting method is switched into the basic encrypting method as described above in the third embodiment, also receives the AV contents encrypted in the basic encrypting method from the AV contents transmission device 31, and the AV contents are decrypted in the basic encrypting method. On the other hand, the AV contents transmission device 31 changes again into the extended encrypting method when the AV contents transmission device 31 determines that the second AV contents reception device 33 is illegal.

In addition, all or a part of the components means and elements of the AV contents communications system according to the aforementioned third embodiment may be either hardware, or software having the same function as the hardware.

Furthermore, the present invention is a program recording medium characterized by storing a program for directing a computer to perform all or a part of respective functions in each step of the AV contents transmitting method described. The present invention is a program recording medium storing a program for directing a computer to perform all or a part of each step of the AV contents receiving method described.

Industrial Applicability

As described above, it is clear that the present invention according to claim 1 can provide a data transmitting and receiving method for improving the transmission and reception efficiency by improving the security through the update of a control key and reducing the frequency of the authentication and key exchange process. The present invention according to claim 6 can provide a data transmission apparatus for improving the transmission and reception efficiency by improving the security through the update of a control key and reducing the frequency of the authentication and key exchange process. The present invention according to claim 8 can provide a data reception apparatus for improving the transmission and reception efficiency by improving the security through the update of a control key and reducing the frequency of the authentication and key exchange process. Further, the present invention can provide a data transmission and reception system for improving the transmission and reception efficiency by improving the security through the update of a control key and reducing the frequency of the authentication and key exchange process. The present invention can provide a program recording medium storing a program for directing a computer to perform each function of all or a part of each component provided in each means forming part of the present invention.

In addition, the present invention can provide an AV contents transmitting method capable of allowing an AV contents reception apparatus which cannot use a first encrypting method to decrypt AV contents when an AV contents transmission apparatus transmits AV contents encrypted in the first encrypting method.

Furthermore, the present invention can provide an AV contents transmission apparatus capable of allowing an AV contents reception apparatus which cannot use a first encrypting method to decrypt AV contents when an AV contents transmission apparatus transmits AV contents encrypted in the first encrypting method.

In addition, when the above described AV contents transmitting method is used, and when there is an AV contents reception apparatus which receives and decrypts the AV contents encrypted in the first encrypting method in addition to an AV contents reception apparatus which cannot use the first encrypting method, the present invention can provide an AV contents transmitting method and an AV contents receiving method for allowing the AV contents to be decrypted squently.

Furthermore, when the aforementioned AV contents transmission apparatus instructs the AV contents reception apparatus which cannot use the first encrypting method to decrypt the AV contents, the present invention can provide another AV contents reception apparatus capable of continuously decrypting the AV contents encrypted in the first encrypting method, in addition to the AV contents reception apparatus mentioned above.

What is claimed is:

1. A data transmitting and receiving method comprising the steps of:

on a transmission side, encrypted digital data obtained by performing a first encryption process on digital data using a work key, and an encrypted work key obtained by performing a second encryption process on the work key using a control key, are transmitted, and on a reception side, the encrypted work key is received and decrypted using the control key obtained by performing an authentication and key exchange process with the transmission side, and the encrypted digital data is received and decrypted using the decrypted work key, thereby obtaining the digital data, on said transmission side, the control key is periodically or non-periodically updated, an identifier identifying the control key is assigned for each control key; and on said reception side, when a reception process is suspended and then resumed, it is determined whether or not the control key has been updated while the reception process is being suspended by referring to the identifier transmitted from the transmission side, and, when it is determined that the control key has been updated, the authentication and key exchange process is performed again, thereby obtaining the updated control key;

wherein said reception side requests the transmission side to transmit the identifier when the reception process is suspended and then resumed; and said transmission side transmits the identifier when the authentication and key exchange process is performed, and also transmits the identifier in response to the request;

the reception side receives the identifier transmitted from the transmission side, and the reception side does not perform the authentication and key exchange process, based on the received identifier and determining that the control key has not been updated.

2. The data transmitting and receiving method according to claim 1, wherein said transmission side periodically or non-periodically transmits the identifier to said reception side.

3. The data transmitting and receiving method according to claim 2, wherein said transmission side periodically or non-periodically updates the work key, and transmits to the reception side the identifier, together with the work key, corresponding to the control key used when the first encryption process is performed on the work key.

4. The data transmitting and receiving method according to any one of claims 1 through 3, wherein said transmission side does not update the work key until the authentication and key exchange process is completed on the updated control key after the key encryption means updates the control key.

5. Data transmission and reception apparatus, comprising:

the data transmission apparatus including:

encryption means periodically or non-periodically updating/generating a work key, performing a first encryption process on digital data using the work key to convert the digital data into encrypted digital data, and transmitting the encrypted digital data to the data reception apparatus;

a key encryption means periodically or non-periodically updating/generating a control key, performing a second encryption process on the work key using the control key to convert the work key into encrypted work key, and transmitting the encrypted work key to the data reception apparatus;

a transmission side authentication and key exchange means performing an authentication and key exchange process with the data reception apparatus;

identifier generation means generating an identifier identifying the control key; and identifier transmission means transmitting the identifier to the data reception apparatus; and the data reception apparatus including:

a reception side authentication and key exchange means performing an authentication and key exchange process with the data transmission apparatus;

key restoration means restoring a work key by decrypting an encrypted work key converted by performing a second encryption process on the work key using a control key, said restoring process being performed using the control key obtained through said reception side authentication and key exchange means;

decryption means restoring digital data by decrypting encrypted digital data converted by performing a first encryption process on the digital data using the work key, said decrypting process being performed using the work key restored by said key restoration means; and identifier recognition means determining whether or not the control key has been updated by referring to an identifier identifying the control key transmitted from said data transmission apparatus at least when a reception process is suspended and then resumed, and, when it is determined that the control key has been updated, instructing said reception side authentication and key exchange means to perform again the authentication and key exchange process to obtain the updated control key, the identifier recognizing means receives the identifier transmitted from the transmission apparatus and the identifier recognizing means does not perform the authentication and key exchange process, based on the received identifier and determining that the control key has not been updated.

6. The data transmission apparatus according to claim 5, wherein said encryption means does not update the work key until the authentication and key exchange process is completed on the updated control key after the key encryption means updates the control key.

7. The data reception apparatus according to claim 5, comprising:

identifier storage means storing the identifier, in which said identifier recognition means determines whether or not the control key has been updated by comparing a latest identifier transmitted from said data transmission apparatus with the identifier transmitted immediately before the latest identifier and stored in said identifier storage means.

8. The data transmission apparatus according to claim 6 or 5, wherein said identifier transmission means transmits the identifier when the authentication and key exchange process is performed, and also transmits the identifier in response to a request from said data reception apparatus.

9. The data reception apparatus according to claim 5 or 7, further comprising:

identifier request means requesting said data transmission apparatus to transmit the identifier when the reception process is suspended and then resumes.

10. The data transmission apparatus according to claim 6 or 5, wherein said identifier transmission means periodically or non-periodically transmit the identifier to said data reception apparatus.

11. The data transmission apparatus according to claim 10, wherein said identifier transmission means transmits to'said data reception apparatus the identifier corresponding to the control key used when the second encryption process is performed on the updated/generated work key each time the work key is updated/generated.

12. A computer readable program recording medium, characterized by storing a program for directing a computer to perform each function of all or a part of each component of the data transmission apparatus or the data reception apparatus according to any one of claims 5 through 7.

13. A data transmission and reception method, comprising the steps of:

on a transmission side, encrypted digital data obtained by performing an encryption process on digital, data using a work key is transmitted;

on a reception side, a control key required to obtain the work key is obtained by performing an authentication and key exchange process with said transmission side, and the received encrypted digital data is decrypted using the work key obtained using the control key to obtain the digital data, wherein:

said transmission side periodically and non-periodically updates the-control key, assigns an identifier identifying the control key for each control key, said reception side determines whether or not the control key has been updated while the reception process is suspended by referring to the identifier transmitted from the transmission side when the reception process is suspended and then resumed, and, when it is determined that the control key has been updated, obtains the updated control key by performing again the authentication and key exchange process, and the reception side receives the identifier transmitted from the transmission side, and the reception side does not perform the authentication and key exchange process, after receiving the identifier and determining that the control key has not been updated.

14. A data reception apparatus, comprising:

reception means receiving encrypted digital data obtained by encrypting digital data using a work key;

and a reception side authentication and key exchange means performing an authentication and key exchange process with a data transmission apparatus;

a control key obtaining means obtaining a control key required to obtain the work key through the reception side authentication and key exchange means;

decryption means decrypting the encrypted digital data using the work key generated using the control key to restoring the digital data; and identifier recognition means determining whether or not the control key has been updated by referring to an identifier identifying the control key transmitted from the data transmission apparatus when the receiving process is suspended and then resumed, and, when it is determined that the control key has been updated, the updated control key is obtained by performing again the authentication and key exchange process with the reception side authentication and key exchange means wherein said reception means requests the data transmission apparatus to transmit the identifier when the receiving process is suspended and then resumed;

said data transmission apparatus transmits the identifier in response to the request;

the reception means receives the identifier transmitted from the transmission side, and does not perform the authentication and key exchange process, based on the received identifier and determining that the control key has not been updated.

* * * * *